(12) United States Patent
Ohhashi

(10) Patent No.: US 8,763,017 B2
(45) Date of Patent: Jun. 24, 2014

(54) COMMUNICATIONS DEVICE, ELECTRONIC APPARATUS, INFORMATION PROCESSING SYSTEM, APPLICATION EXECUTING METHOD, AND RECORDING MEDIUM

(75) Inventor: Hideki Ohhashi, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 986 days.

(21) Appl. No.: 11/638,570

(22) Filed: Dec. 14, 2006

(65) Prior Publication Data

US 2007/0198999 A1    Aug. 23, 2007

(30) Foreign Application Priority Data

Dec. 15, 2005  (JP) .................................. 2005-362343
May 8, 2006    (JP) .................................. 2006-129484

(51) Int. Cl.
G06F 3/00   (2006.01)
G06F 9/44   (2006.01)
G06F 9/46   (2006.01)
G06F 13/00  (2006.01)

(52) U.S. Cl.
USPC ......................................................... 719/321

(58) Field of Classification Search
USPC ......................................................... 719/321
See application file for complete search history.

(56) References Cited

U.S. PATENT DOCUMENTS

| 2003/0035140 A1* | 2/2003 | Tomita et al. ................. 358/1.15 |
| 2004/0054904 A1* | 3/2004 | Matsuya ........................ 713/168 |
| 2004/0125414 A1* | 7/2004 | Ohishi et al. ................... 358/402 |
| 2004/0255263 A1* | 12/2004 | Ando ............................. 717/100 |

FOREIGN PATENT DOCUMENTS

| JP | 2004-312711   | 11/2004 |
| JP | 2005-228183 A | 8/2005  |

* cited by examiner

*Primary Examiner* — Andy Ho
*Assistant Examiner* — Timothy A Mudrick
(74) *Attorney, Agent, or Firm* — Dickstein Shapiro LLP

(57) ABSTRACT

A communications device is disclosed that includes a communication part configured to perform communications with an electronic apparatus, and an application related to the electronic apparatus. The communication part notifies the application of an event occurring in the electronic apparatus in response to reception thereof, and transmits a request to operate a hardware resource of the electronic apparatus to the electronic apparatus, the request being generated in the processing of the application executed in response to the event.

6 Claims, 18 Drawing Sheets

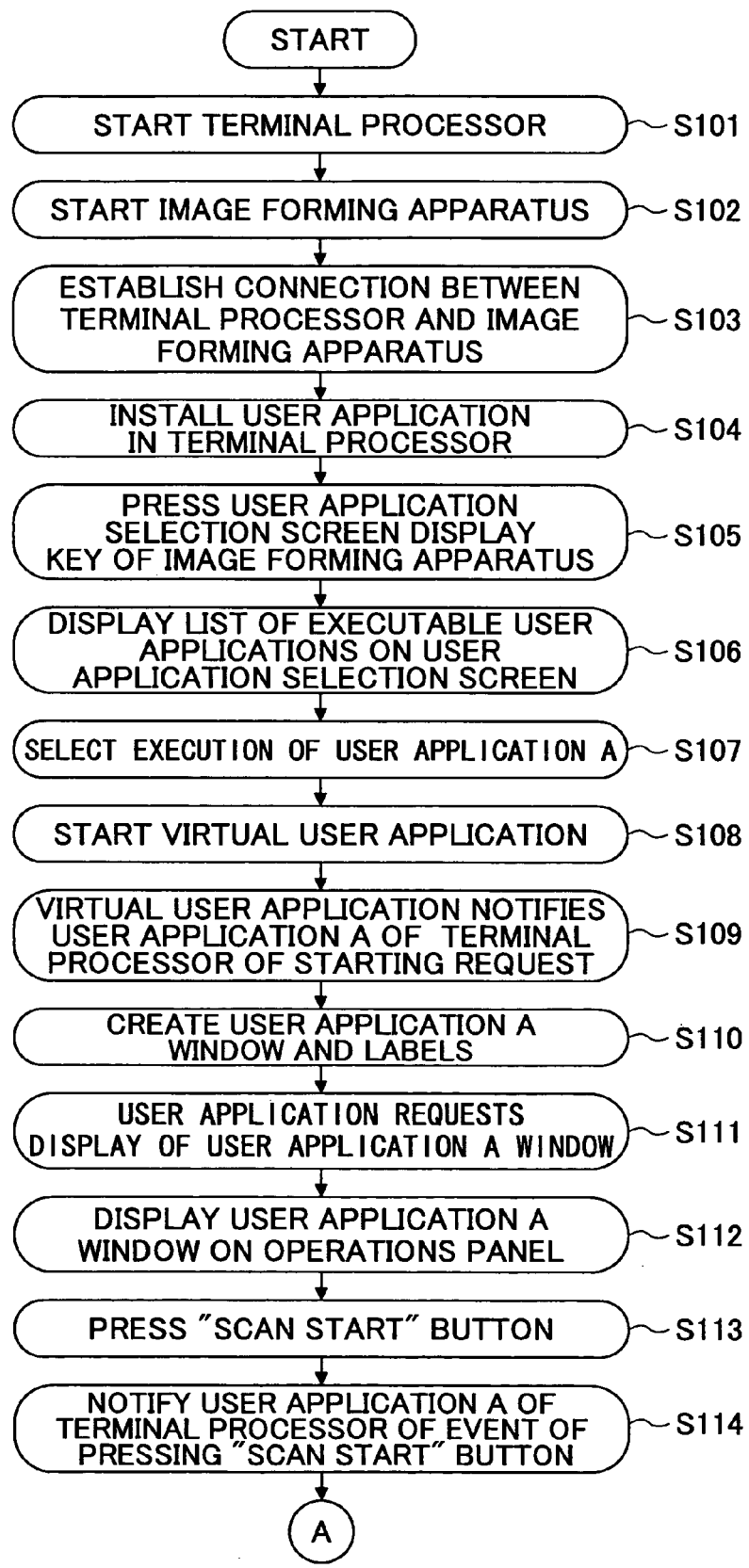

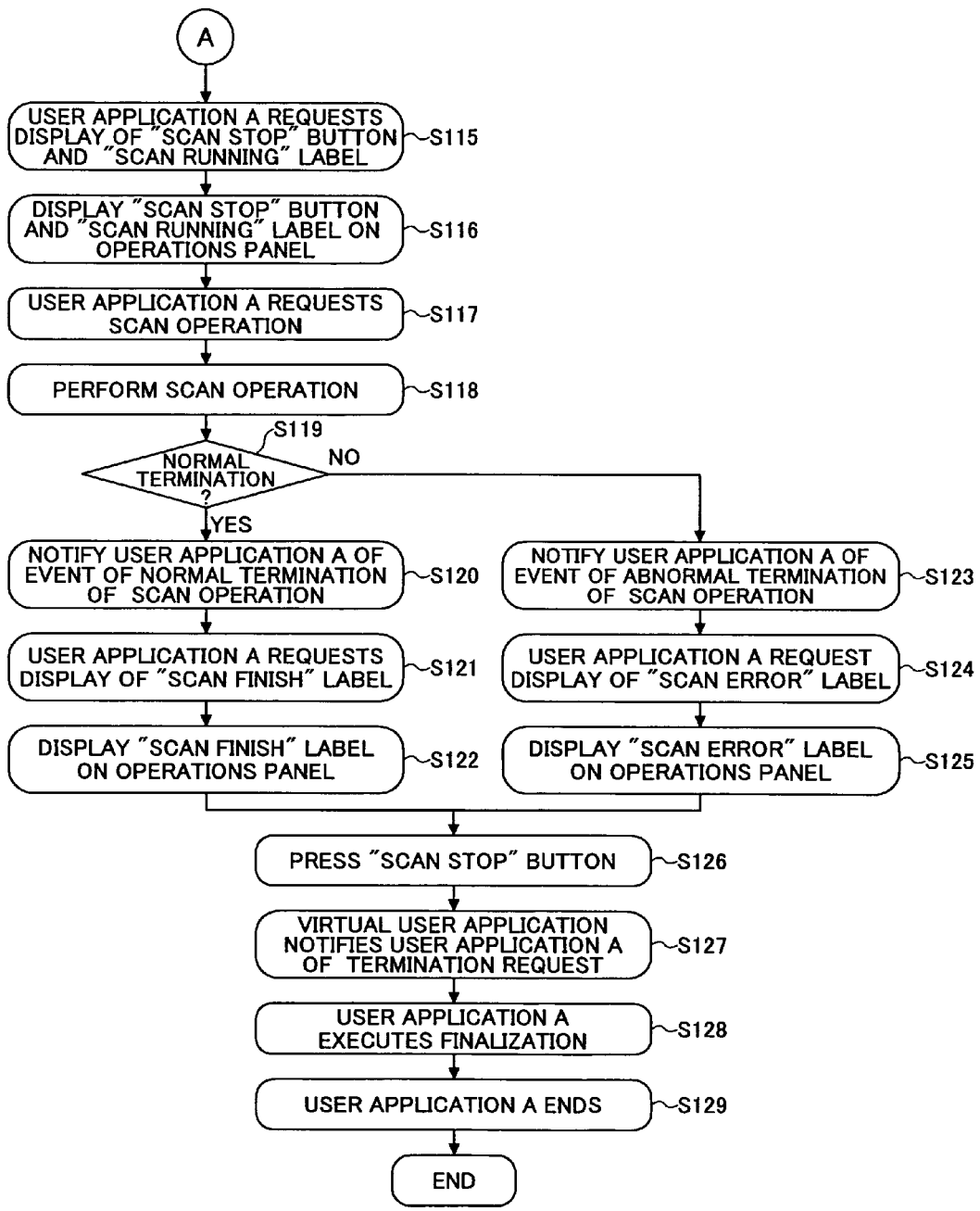

FIG.10

SELECT USER APPLICATION YOU WISH TO EXECUTE

| APPLICATION NAME | INSTALLATION DESTINATION | INSTALLATION OBJECT | STATUS |
|---|---|---|---|
| USER APPLICATION A | TERMINAL PROCESSOR | SD CARD | STANDBY FOR EXECUTION START |
| USER APPLICATION B | TERMINAL PROCESSOR | HDD | STANDBY FOR EXECUTION START |
| USER APPLICATION C | TERMINAL PROCESSOR | SD CARD | STANDBY FOR EXECUTION START |

110

COMMUNICATIONS DEVICE, ELECTRONIC APPARATUS, INFORMATION PROCESSING SYSTEM, APPLICATION EXECUTING METHOD, AND RECORDING MEDIUM

BACKGROUND OF THE INVENTION

1. Field of the Invention

The present invention relates generally to communications devices, electronic apparatuses, information processing systems, application executing methods, and recording media, and more particularly to a communications device that executes an application related to an electronic apparatus, an electronic apparatus capable of executing the application, an information processing system including the communications device and the electronic apparatus, an application executing method, and a recording medium on which is recorded a program for causing a computer to execute the method.

2. Description of the Related Art

In recent years, there has been a technique that enables expansion of a function specialized for a business by publishing an API (Application Program Interface) for controlling software and hardware and adding business applications as required.

This technique is also employed in embedded electronic apparatuses such as PDAs (Personal Digital Assistants), cellular phones, and TVs, and their convenience is improved by adding an application as required.

Further, this technique has also been employed in apparatuses that use hardware resources specialized in handling specific data. As a result, even after shipment of apparatuses, users have been enabled to expand functions easily at the operating sites of the apparatuses by development of business applications using the hardware resources by so-called system integrators.

Embedded electronic apparatuses that employ such hardware resources include multifunction machines with scanner and printer engines. While various applications have been developed to be installed in such multifunction machines, Java® applications (hereinafter referred to as "Java® applications") have been used due to Java® support for multiple platforms and advanced support for networking. (See, for example, Japanese Laid-Open Patent Application No. 2004-312711.) Such Java® applications developed for multifunction machines are installed in devices of the multifunction machines, such as HDDs, and are executed using computers and storage units of the multifunction machines.

Unlike general-purpose computers such as PCs, however, embedded electronic apparatuses including hardware resources as described above are severely limited in terms of hardware in order to avoid an unnecessary increase in cost. This results in a problem in that it is inevitable that Java® applications to be installed are severely restricted. For example, the number of Java® applications that can be simultaneously executed is restricted by the limited capacity of a storage unit. Accordingly, even if simultaneous execution of the Java® applications of a scanner, a facsimile machine, and a Web server is desired, all the Java® applications cannot be started, so that it is necessary to end one Java® application and free part of a storage area before executing another Java® application.

Further, such embedded electronic apparatuses as multifunction machines in a low price range often have lower performance of hardware components such as memory and computers than regular multifunction machines in order to reduce cost. Such embedded electronic apparatuses are restricted in that an environment for executing Java® applications cannot be implemented therein because of limited performance of their hardware components. However, there are also requests that Java® applications be executed in such apparatuses.

SUMMARY OF THE INVENTION

Embodiments of the present invention may solve or reduce one or more of the above-described problems.

According to one embodiment of the present invention, there are provided a communications device, an electronic apparatus, an information processing system, an application executing method, and a recording medium on which is recorded a program for causing a computer to execute the method in which one or more of the above-described problems are solved or reduced.

According to one embodiment of the present invention, there are provided a communications device, an electronic apparatus, an information processing system, and an application executing method capable of relaxing restrictions on execution of an application due to the limitations of the hardware resources of the electronic apparatus, and a recording medium on which is recorded a program for causing a computer to execute the application executing method.

According to one embodiment of the present invention, there is provided a communications device including a communication part configured to perform communications with an electronic apparatus; and an application related to the electronic apparatus, wherein the communication part notifies the application of an event occurring in the electronic apparatus in response to reception thereof, and transmits a request to operate a hardware resource of the electronic apparatus to the electronic apparatus, the request being generated in processing of the application executed in response to the event.

According to one embodiment of the present invention, there is provided an electronic apparatus capable of executing a first application, including a communication part configured to transmit an event corresponding to an input related to the first application to a communications device communicating with the electronic apparatus, and to receive a request to operate a hardware resource of the electronic apparatus, the request being generated in processing of a second application of the communications device which processing is executed in response to the event; and a control part configured to control the hardware resource of the electronic apparatus based on the received request to operate the hardware resource.

According to the above-described communications device or electronic apparatus, it is possible to relax restrictions on execution of an application due to the limitations of the hardware resources of the electronic apparatus.

According to one embodiment of the present invention, there is provided an information processing system including an electronic apparatus capable of executing a first application; and a communications device configured to communicate with the electronic apparatus, wherein the electronic apparatus transmits an event corresponding to an input related to the first application to the communications device, and the communications device executes a second application in response to the event, and controls the electronic apparatus by transmitting a request to operate a hardware resource of the electronic apparatus to the electronic apparatus, the request being generated in the second application.

According to one embodiment of the present invention, there is provided an application executing method in a communications device executing an application related to an electronic apparatus by communicating with the electronic apparatus, the application executing method including the steps of (a) receiving an event occurring in the electronic apparatus, and notifying the application of the event; and (b) transmitting a request to operate a hardware resource of the electronic apparatus to the electronic apparatus, the request being generated in processing of the application executed in response to the notification of the event.

According to one embodiment of the present invention, there is provided an application executing method in an electronic apparatus capable of executing a first application, the application executing method including the steps of (a) transmitting an event corresponding to an input related to the first application to a communications device communicating with the electronic apparatus; (b) receiving a request to operate a hardware resource of the electronic apparatus, the request being generated in processing of a second application of the communications device which processing is executed in response to the event; and (c) controlling the hardware resource of the electronic apparatus based on the request to operate the hardware resource.

According to one embodiment of the present invention, there is provided a computer-readable recording medium on which is recorded a program for causing a computer to execute one of the above-described application executing methods.

Thus, according to embodiments of the present invention, there are provided a communications device, an electronic apparatus, an information processing system, and an application executing method capable of relaxing restrictions on execution of an application due to the limitations of the hardware resources of the electronic apparatus, and a recording medium on which is recorded a program for causing a computer to execute the application executing method.

BRIEF DESCRIPTION OF THE DRAWINGS

Other objects, features and advantages of the present invention will become more apparent from the following detailed description when read in conjunction with the accompanying drawings, in which:

FIGS. 9A and 9B are flowcharts for illustrating execution of a user application in the image processing system according to the second embodiment of the present invention;

FIG. 10 is a diagram showing an example display of a user application selection screen according to the second embodiment of the present invention;

DETAILED DESCRIPTION OF THE PREFERRED EMBODIMENTS

A description is given, with reference to the accompanying drawings, of embodiments of the present invention. In the following, a conceptual description of the present invention is given in a first embodiment, and a description is given, in each of second and third embodiments, of a case where the present invention is applied to an image forming apparatus as a specific example of the electronic apparatus.

Figure 1:
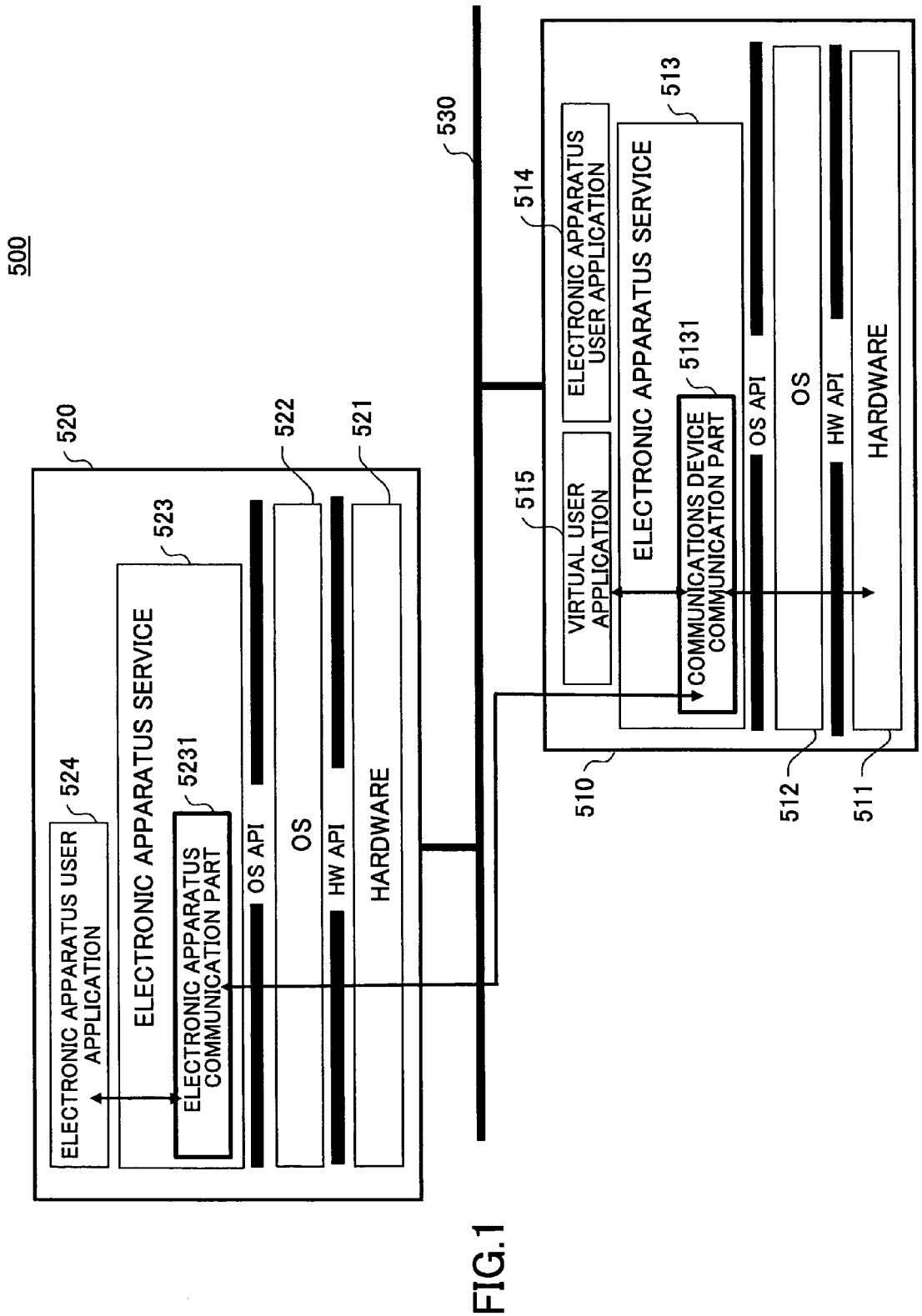
FIG. 1 is a schematic diagram showing an information processing system configuration according to a first embodiment of the present invention.

FIG. 1 is a schematic diagram showing an information processing system configuration according to the first embodiment. Referring to FIG. 1, an information processing system 500 according to the first embodiment includes at least one electronic apparatus 510 and a communication device 520. The electronic apparatus 510 and the communication device 520 are connected to each other via a network 530 (either wired or wireless) such as a LAN (Local Area Network).

Referring to FIG. 1, the electronic apparatus 510 includes hardware 511, an OS (Operating System) 512, an electronic apparatus service 513, an electronic apparatus user application 514, and a virtual user application 515.

The hardware 511 includes hardware resources specific to the electronic apparatus 510 in addition to hardware resources provided to common electronic apparatuses, such as a CPU, a memory, an HDD (Hard Disk Drive), an SD card slot, and a network interface. According to the first embodiment, the electronic apparatus 510 is not limited to a particular apparatus. Generally, electronic apparatuses are provided with hardware resources specific thereto in order to realize their respective functions. The electronic apparatus 510 according to the first embodiment is also provided with hardware resources specific thereto in order to realize its functions. Further, an operations panel, switches, buttons, LEDs, and/or an LCD, serving as an input/output interface with a user, are attached or connected to the electronic apparatus 510 as part of the hardware 511. The user can give instructions to execute applications in the electronic apparatus 510 by operating the operations panel, etc.

The OS 512 is a general-purpose operating system such as UNIX®.

The electronic apparatus service 513 is a program module that provides general-purpose services concerning the electronic apparatus 510 to the upper applications (the electronic apparatus user application 514 and the virtual user application 515) through an API (Application Program Interface) for controlling the hardware 511 of the electronic apparatus 510. The electronic apparatus service 513 includes a communications device communication part 5131 as part thereof.

The communications device communication part 5131 causes the communications device 520 to execute at least part of processing necessary to provide a service requested by a user by communicating with an electronic apparatus communication part 5231 of the communications device 520.

That is, receiving (information of) an asynchronous event that occurs from the OS 512, the communications device communication part 5131 transmits a message that reports the occurrence of the event to the electronic apparatus communication part 5231 of the communications device 520. As described in detail below, receiving the message, the electronic apparatus communication part 5231 of the communications device 520 notifies an electronic apparatus user application 524 of the communications device 520 of the event based on the message. In this embodiment, the term "event" includes information detected by hardware provided in the electronic apparatus 510, such as sensors (not graphically illustrated), and reported to software. Accordingly, information reported to software based on, for example, user's input to a button or the operations panel, completion of processing in a hardware resource, or occurrence of abnormality is included in the event.

The communications device communication part 5131 also receives an operation request to a hardware resource of the electronic apparatus 510 in the processing of the electronic apparatus user application 524 in the communications device 520 from the electronic apparatus communication part 5231 of the communications device 520, causes an operation corresponding to the contents of the operation request to be performed, and returns the result of the operation to the electronic apparatus communication part 5231. This mechanism is based on the mechanism of RPC (Remote Procedure Call). That is, the communications device communication part 5131 executes the function of a corresponding software module in response to an RPC-based call for the function from the electronic apparatus communication part 5231 of the communications device 520, and returns the result to the electronic apparatus communication part 5231.

The virtual user application 515 is one of applications implemented by a user or a software vender after shipment of the electronic apparatus 510 (hereinafter referred to as "user applications"), and is implemented as, for example, a Java® application. Here, the term "virtual" is used because the virtual user application 515 is for causing the electronic apparatus user application 524 implemented as a user application in the communications device 520 to be transparently used, and its substantive processing is not implemented.

That is, the virtual user application 515 causes a user application implemented in the electronic apparatus communication part 5231 through the communications device communication part 5131 to execute its substantive processing (such as business logic). Accordingly, most of the processing performed by the virtual user application 515 is relatively light-load processing such as causing a user interface (such as a button) for starting or stopping a user application to be displayed on the operations panel of the electronic apparatus 510 and transmitting a request to start or stop a user application to the electronic apparatus communication part 5231 through the communications device communication part 5131 when a trigger (user's input) to start or stop the user application occurs through a user interface.

Referring to FIG. 1, the electronic apparatus user application 514 is also implemented in the electronic apparatus 510. The electronic apparatus user application 514 is also one of user applications, and operates on the electronic apparatus 510. That is, not only the virtual user application 515 but also a user application that performs substantive processing may be executable on the electronic apparatus 510.

Next, a description is given of the communications device 520. The communications device 520, which executes the substantive processing of the virtual user application 515 of the electronic apparatus 510, includes hardware 521, an OS 522, an electronic apparatus service 523, and the electronic apparatus user application 524.

The hardware 521 includes hardware resources such as a CPU, a memory, an HDD (Hard Disk Drive), an SD card slot, and a network interface.

The OS 522 is a general-purpose operating system such as UNIX® or Linux.

The electronic apparatus service 523 assumes substantially the same role as the electronic apparatus service 513 in the electronic apparatus 510. However, while the electronic apparatus service 513 in the electronic apparatus 510 is provided with the communications device communication part 5131, the electronic apparatus service 523 includes the electronic apparatus communication part 5231 as part thereof.

The electronic apparatus communication part 5231 communicates with the communications device communication part 5131 of the electronic apparatus 510, thereby transmitting, to the communications device communication part 5131 of the electronic apparatus 510, an operation request to the electronic apparatus 510 generated in a user application (the electronic apparatus user application 524) on the communications device 520.

That is, a user application that performs the substantive processing of the virtual user application 515 of the electronic apparatus 510 is started in the communications device 520. However, since there is no hardware specific to the electronic apparatus 510 in the communications device 520, a request to operate a hardware resource by a user application cannot be actually executed in the communications device 520. Accordingly, when a request to operate the hardware 511 of the electronic apparatus 510 is made in the user application of the communications device 520, the electronic apparatus communication part 5231 transmits the operation request to the operation-target electronic apparatus 510, thereby causing the electronic apparatus 510 to perform a corresponding operation. Then, the electronic apparatus communication part 5231 receives its result. As a result, the hardware resource of the electronic apparatus 510 is virtually implemented on the communications device 520.

RPC is used in transmission of an operation request to the electronic apparatus 510 (the communications device communication part 5131) by the communications device 520 (the electronic apparatus communication part 5231). That is, the electronic apparatus communication part 5231 has a mechanism for remotely calling the same function on the electronic apparatus 510 side and receiving its result when a function is called in the communications device 520.

Further, the electronic apparatus communication part 5231 causes the electronic apparatus user application 524 on the communications device 520 to execute at least part of processing (substantive processing) necessary to provide a service requested by a user in the electronic apparatus 510 by communicating with the communications device communication part 5131 of the electronic apparatus 510. That is, the electronic apparatus communication part 5231 receives an asynchronous event that occurs in the electronic apparatus 510 and is transmitted from the communications device communication part 5131, and notifies a corresponding user application that is being executed of the event.

The electronic apparatus user application 524 is a user application that operates on the communications device 520. That is, the electronic apparatus user application 524 performs substantive processing in the virtual user application 515 of the electronic apparatus 510 on the communications device 520.

As described above, the electronic apparatus service 523 is the same as the electronic apparatus service 513 in the electronic apparatus 510 (that is, the electronic apparatus service 523 provides a compatible or the same interface to upper applications). Accordingly, it is possible to cause an application that operates on the electronic apparatus service 513 in the electronic apparatus 510 to operate on the electronic apparatus service 523 of the communications device 520 as it is. Accordingly, there is no need to modify a user application anew in the case of changing the location of installation of the user application from the electronic apparatus 510 to the communications device 520.

Figure 2:
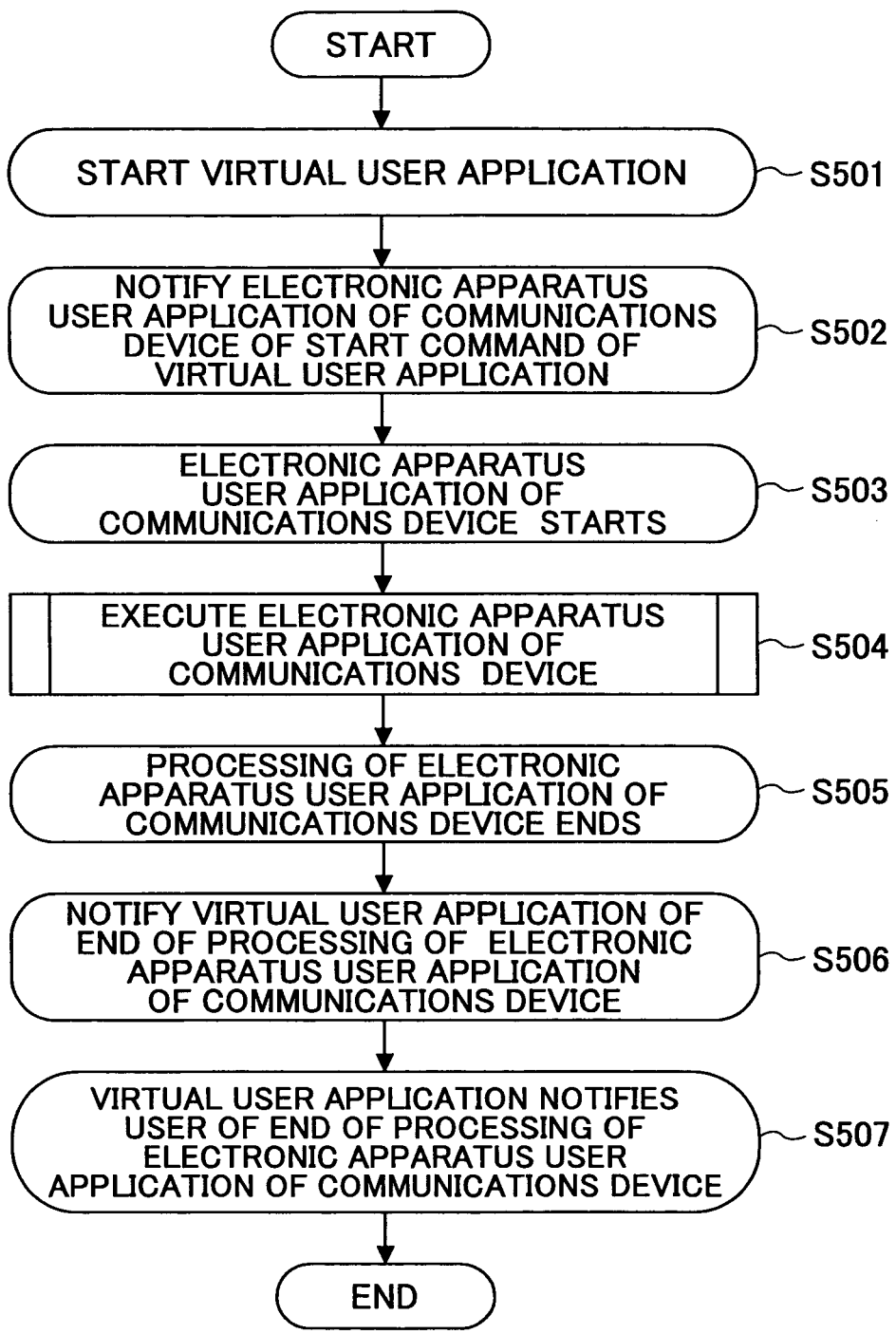
FIG. 2 is a flowchart for illustrating a processing procedure in the information processing system according to the first embodiment of the present invention.

A description is given below of a processing procedure of an information processing system 500 according to the first embodiment. FIG. 2 is a flowchart for illustrating a processing procedure in the information processing system 500 according to the first embodiment.

When a user starts the virtual user application 515 from the user interface of the electronic apparatus 510 in step S501, and issues a start command to the electronic apparatus user application 524 on the communications device 20, in step S502, the electronic apparatus user application 524 on the communications device 520 is notified of the start command as an event through the communications device communication part 5131 and the electronic apparatus communication part 5231. In step S503, the electronic apparatus user application 524 is started on the communications device 20 in response to the event.

While the electronic apparatus user application 524 is being started, in step S504, the processing of the electronic apparatus user application 524 is executed using an event that occurs in the electronic apparatus 510 as a trigger. A detailed description of this step is given below.

When the processing of the electronic apparatus user application 524 ends in step S505, in step S506, the virtual user application 515 is notified of the end of the processing through the electronic apparatus communication part 5231 and the communications device communication part 5131. In step S507, the virtual user application 515 notifies the user of the end of the processing by, for example, causing a message to that effect to be displayed on the operations panel.

Figure 3:
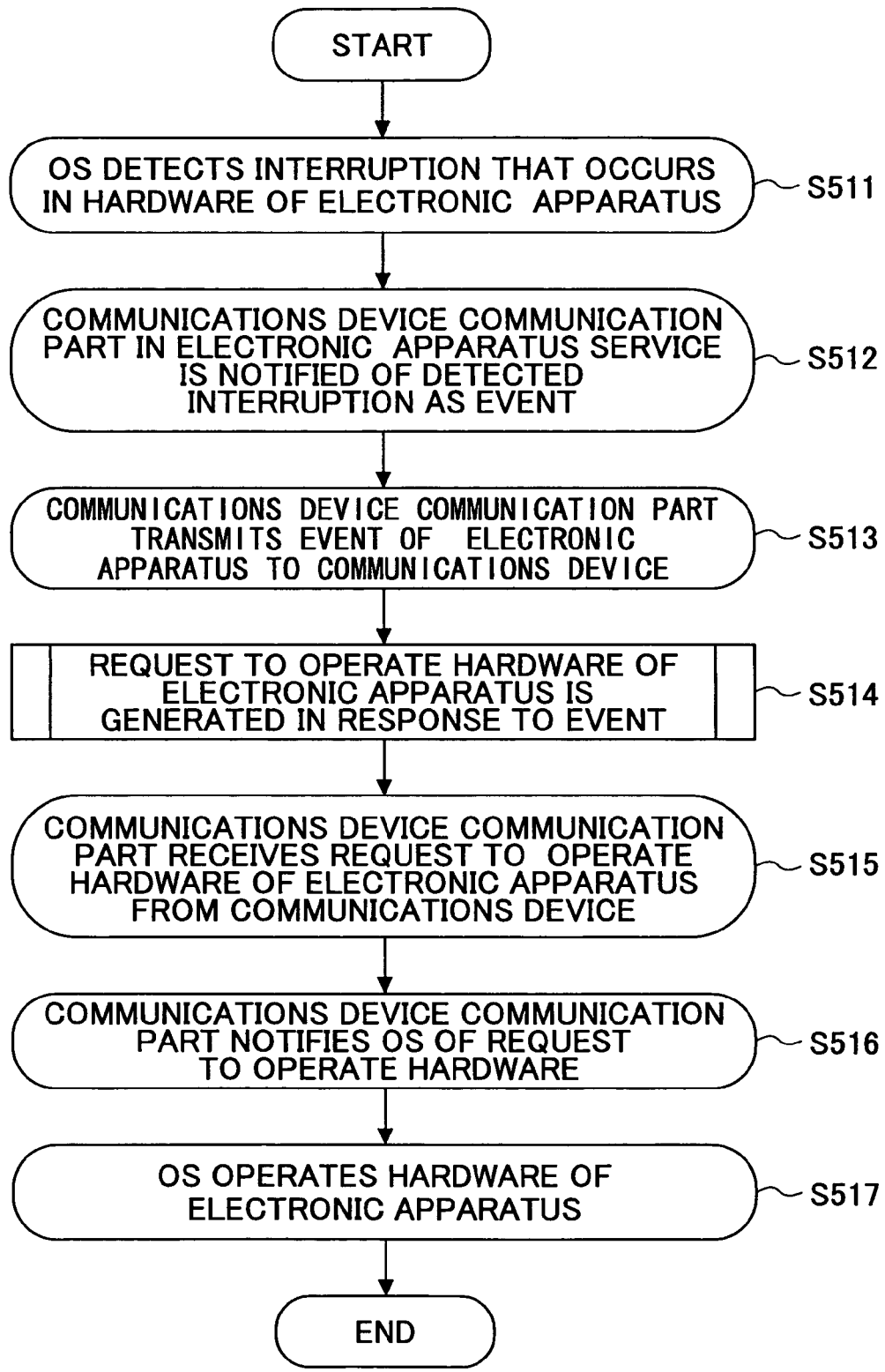
FIG. 3 is a flowchart for illustrating a procedure of processing by an electronic apparatus at the time of execution of an electronic apparatus user application according to the first embodiment of the present invention.

Next, a description is given of processing executed by the electronic apparatus 510 in step S504 of FIG. 2. FIG. 3 is a flowchart for illustrating a procedure of processing by the electronic apparatus 510 at the time of execution of the electronic apparatus user application 524.

In step S511, an interruption (interrupt) that occurs in the hardware 511 of the electronic apparatus 510 is detected by the OS 512. For example, when a button for a user interface displayed on the operations panel attached or connected to the electronic apparatus 510 is pressed, an interrupt occurs and is detected by the OS 512. In step S512, the communications device communication part 5131 in the electronic apparatus service 513 is notified of the detected interrupt as a software event. Then, in step S513, the communications device communication part 5131 transmits (information of) the event to the communications device 20.

Receiving the event, in step S514, the communications device 20 executes processing corresponding to the event, in which processing an operation request to the hardware 511 of the electronic apparatus 510 is generated. The generated operation request is transmitted to the communications device 520. A detailed description of this step is given below.

Receiving the operation request, in step S516, the communications device communication part 5131 of the communications device 520 notifies the OS 512 of the operation request. In step S517, the OS 512 controls the hardware 511, and realizes a function corresponding to the operation request. If another interrupt occurs as a result of operating the hardware 511, the procedure in FIG. 3 is repeated. The processing procedure in FIG. 3, which starts with an interrupt by the hardware 511, is asynchronously performed during execution of the electronic apparatus user application 524.

Figure 4:
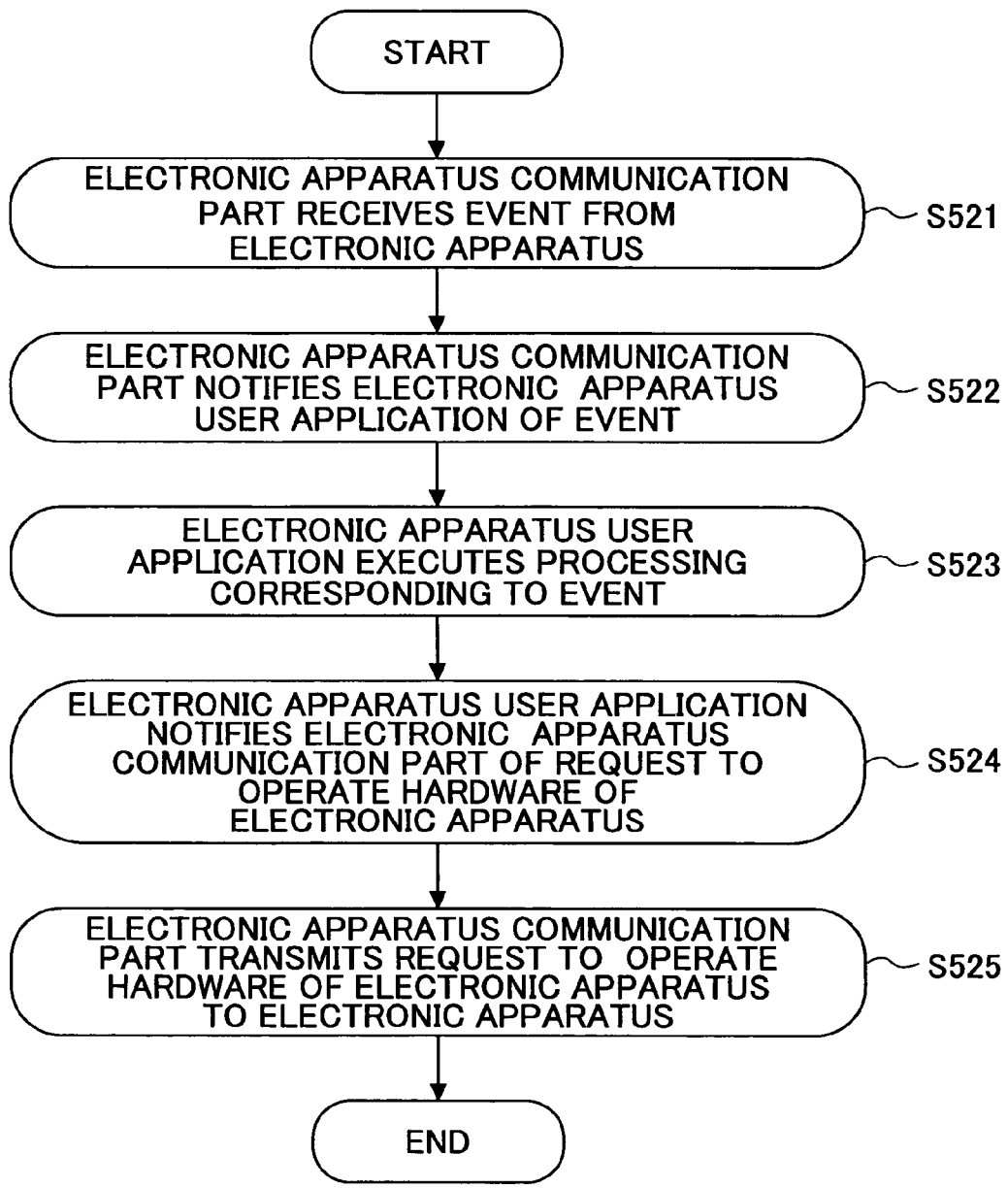
FIG. 4 is a flowchart for illustrating a procedure of processing by a communications device at the time of execution of the electronic apparatus user application according to the first embodiment of the present invention.

Next, a description is given of processing executed by the communications device 520 in step S514 of FIG. 3. FIG. 4 is a flowchart for illustrating a procedure of processing by the communications device 520 at the time of execution of the electronic apparatus user application 524.

In step S521, the electronic apparatus communication part 5231 receives (information of) the event from the electronic apparatus 510. Then, in step S522, the electronic apparatus communication part 5231 notifies the electronic apparatus user application 524 of the event. In step S523, the electronic apparatus user application 524 executes processing corresponding to the event on the communications device 520. When it is necessary to operate the hardware 511 of the electronic apparatus 510 during execution of the processing, in step S524, the electronic apparatus user application 524 notifies the electronic apparatus communication part 5231 of a request for the operation.

In step S525, the electronic apparatus communication part 5231 transmits the operation request to the electronic apparatus 510. The operation request is received by the communications device communication part 5131 of the electronic apparatus 510 in step S515 described in FIG. 3.

As described above, in the information processing system 500 according to the first embodiment, the communications device 520 is caused to execute at least part of processing that an application of the electronic apparatus 510 is requested to execute, and the communications device 520 is caused to control a hardware resource of the electronic apparatus 510 as required. That is, it is possible to distribute the work load on the electronic apparatus 510 by executing a user application not on the electronic apparatus 510, which is in general severely restricted in memory capacity, but using the memory of the communications device 520 that can be increased in memory as desired. Accordingly, it is possible to cause a user application to be executed without being bound by the restriction of the memory of the electronic apparatus 510.

Next, a description is given of the second embodiment of the present invention. In the second embodiment, a description is given, taking an image forming apparatus such as a multifunction machine as a specific example of the electronic apparatus 510.

Figure 5:
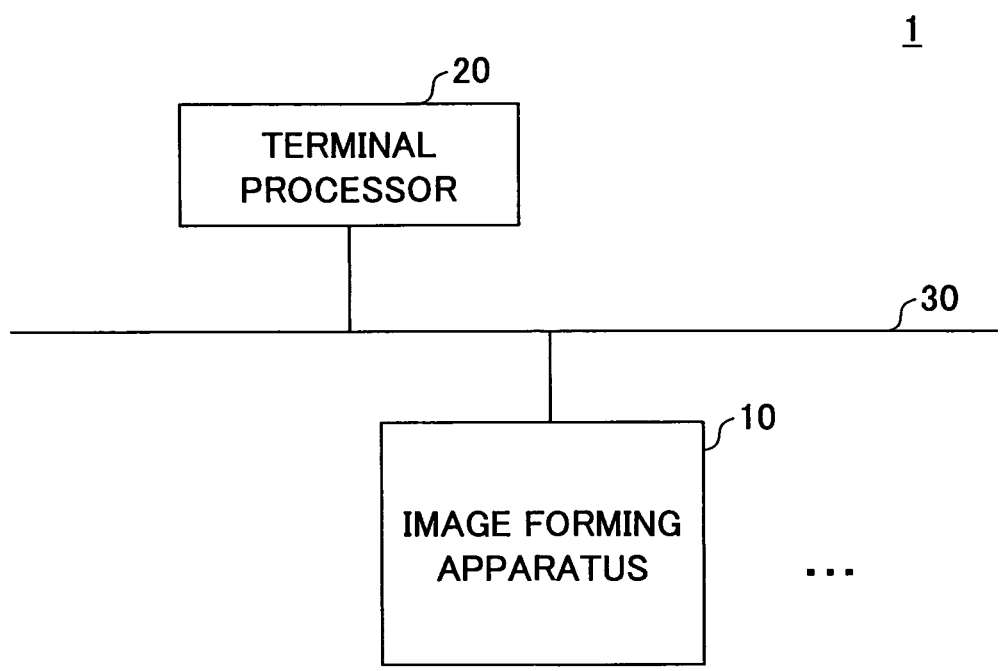
FIG. 5 is a diagram showing an image processing system configuration according to a second embodiment of the present invention.

FIG. 5 is a diagram showing an image processing system configuration according to the second embodiment. Referring to FIG. 5, an image processing system 1 includes at least one image forming apparatus 10 and a terminal processor 20. The image forming apparatus 10 and the terminal processor 20 are connected to each other via a network 30 (either wired or wireless) such as a LAN (Local Area Network).

Figure 6:
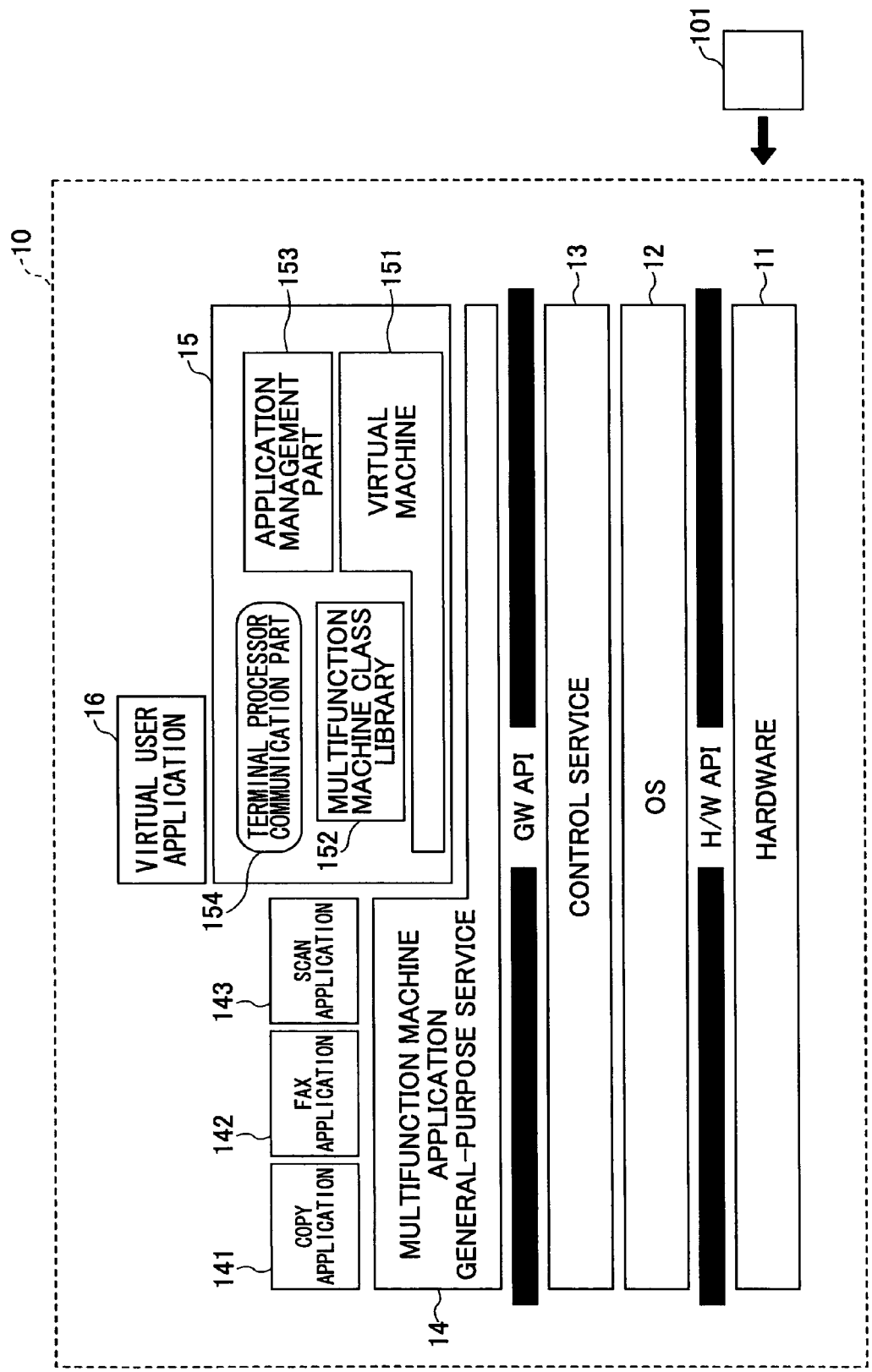
FIG. 6 is a schematic diagram showing a configuration of an image forming apparatus according to the second embodiment of the present invention.

FIG. 6 is a schematic diagram showing a configuration of the image forming apparatus 10 according to the second embodiment. Referring to FIG. 6, the image forming apparatus 10 includes hardware 11, an OS 12, a control service 13, a multifunction machine application general-purpose service 14, a copy application 141, a FAX (facsimile) application 142, a scan application 143, a Java® application execution environment 15, and a virtual user application 16.

The hardware 11 includes a scanner and a plotter for performing copying, facsimile transmission and reception, scanning, printing, etc., as hardware resources specific to the image forming apparatus 10 in addition to hardware resources provided to common electronic apparatuses, such as a CPU, a memory, an HDD (Hard Disk Drive), an SD card slot, and a network interface. Further, the image forming apparatus 10 includes an operations panel serving as an input/output interface with a user as part of the hardware 11. The user can give instructions to execute applications in the image forming apparatus 10 by operating the operations panel.

The OS 12 is a general-purpose operating system such as UNIX®.

The control service 13 is a library that provides an API for controlling the hardware resources specific to the image forming apparatus 10. For example, the control service 13 provides an API that allows an upper software layer to easily use services specific to the image forming apparatus 10, such as a service for performing display control of the operations panel of the image forming apparatus 10, a service for controlling a FAX function, a service for controlling a copy function, a service for controlling a scan function (hereinafter referred to as "scan service"), a service for controlling a printing function, a service for controlling a network function, and a service for performing user authentication.

The multifunction machine application general-purpose service 14 is a program module that abstracts the API of the control service 13 so as to have an API that allows an upper application to easily use the control service 13 and other software modules below. The multifunction machine application general-purpose service 14 is written in a programming language such as C or C++, and can be called from a Java® class that operates on a virtual machine 151, using JNI (Java® Native Interface).

The copy application 141, the FAX application 142, and the scan application 143 are preinstalled in the image forming apparatus 10 at the time of its shipment, and operate on the multifunction machine application general-purpose service 14. The copy application 141 starts a copy function. The FAX application 142 starts a FAX function. The scan application 143 starts a scan function.

The Java® application execution environment 15 is a software module group that implements an environment for executing a Java® application on the image forming apparatus 10. The Java® application execution environment 15 includes the virtual machine 151, a multifunction machine class library 152, an application management part 153, and a terminal processor communication part 154.

The virtual machine 151 is a so-called Java® virtual machine that interprets and executes an intermediate code (Java® bytecode) generated by a Java® compiler.

The multifunction machine class library 152 is a library formed of a group of Java® classes (for example, a scan class, a FAX class, and a panel class corresponding to the operations panel) that operate on the virtual machine 151 and provide interfaces for controlling the hardware resources specific to the image forming apparatus 10. The multifunction machine class library 152 is called by a Java® application that operates on the Java® application execution environment 15.

The application management part 153 performs general management of Java® applications. For example, the application management part 153 installs Java® applications in recording media of the image forming apparatus 10, such as an HDD and an SD card, and starts and ends installed Java® applications.

The terminal processor communication part 154 operates on the virtual machine 151 and communicates with an image forming apparatus communication part 244 (FIG. 7) of the terminal processor 20, thereby causing the terminal processor 20 to execute at least part of processing necessary to provide a service requested by a user.

That is, when the terminal processor communication part 154 receives (information of) an asynchronous event that occurs in layers at and below the control service 13 (hereinafter referred to as "native layers"), the terminal processor communication part 154 transmits a message reporting the occurrence of the event to the image forming apparatus communication part 244 of the terminal processor 20. As described in detail below, receiving the message, the image forming apparatus communication part 244 of the terminal processor 20 notifies a Java® application that operates on a Java® application execution environment 24 (FIG. 7) of the terminal processor 20 of the event based on the message.

Further, the terminal processor communication part 154 also receives an operation request to a hardware resource of the image forming apparatus 10 in the processing of a Java® application in the terminal processor 20 from the image forming apparatus communication part 244 of the terminal processor 20, causes an operation corresponding to the contents of the operation request to be performed, and returns the result of the operation to the image forming apparatus communication part 244. This mechanism is based on the mechanism of RPC (Remote Procedure Call). That is, the terminal processor communication part 154 executes the function of a corresponding software module in response to an RPC-based call for the function from the image forming apparatus communication part 244 that operates on a virtual machine 241 (FIG. 7) of the terminal processor 20, and returns the result to the image forming apparatus communication part 244.

The virtual user application 16 is one of Java® applications as user applications implemented by a user or a software vender after shipment of the image forming apparatus 10, and operates on the Java® application execution environment 15. Here, the term "virtual" is used because the virtual user application 16 is for causing a user application implemented in the terminal processor 20 to be transparently used, and its substantive processing is not implemented.

That is, the virtual user application 16 causes a Java® application implemented in the terminal processor 20 through the terminal processor communication part 154 to execute its substantive processing (such as a business logic). Accordingly, most of the processing performed by the virtual user application 16 is relatively light-load processing such as causing a user interface (such as a button) for starting or stopping a user application to be displayed on the operations panel of the image forming apparatus 10 and transmitting a request to start or stop a user application to the terminal processor 20 through the terminal processor communication part 154 when a trigger (user's input) to start or stop the user application occurs through a user interface.

One or more programs that implement the above-described software modules in the image forming apparatus 10 may be installed from a recording medium 101 such as a CD-ROM or an SD card or through the network 30.

Figure 7:
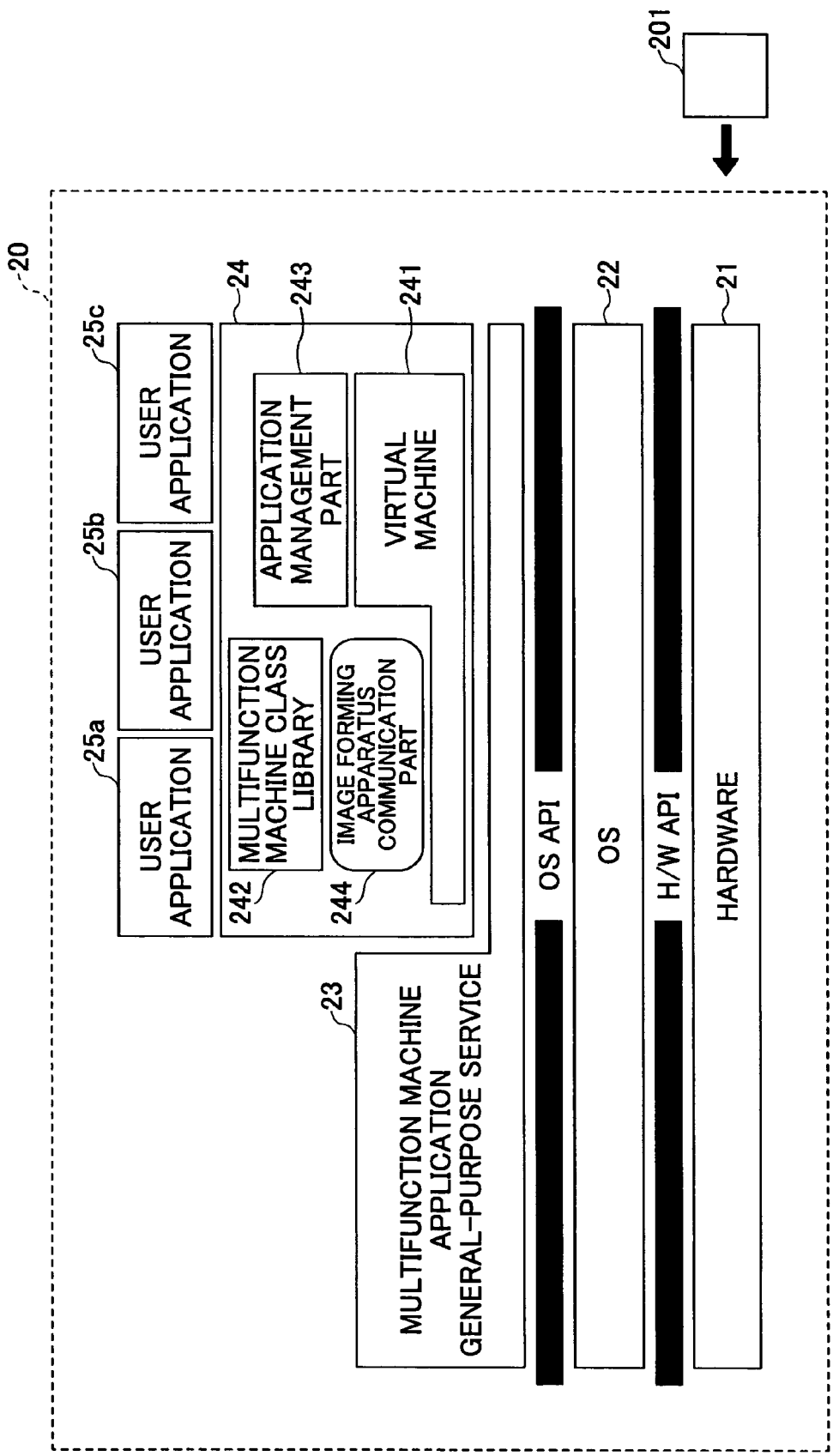
FIG. 7 is a schematic diagram showing a configuration of a terminal processor according to the second embodiment of the present invention.

Next, a description is given of the terminal processor 20. FIG. 7 is a schematic diagram showing a configuration of the terminal processor 20 according to the second embodiment. In FIG. 7, the terminal processor 20 is a communications device that executes the substantive processing of the virtual user application 16 of the image forming apparatus 10. The terminal processor 20 includes hardware 21, an OS 22, a multifunction machine application general-purpose service 23, the Java® application execution environment 24, a user application 25a, a user application 25b, and a user application 25c. The terminal processor 20 is not limited to a general-purpose computer such as a PC, and can be any apparatus that allows a Java® virtual machine to be installed therein and allows a Java® application to be executed on the Java® virtual machine.

The hardware 21 includes hardware resources such as a CPU, a memory, an HDD (Hard Disk Drive), an SD card slot, and a network interface.

The OS 22 is a general-purpose operating system such as UNIX® or Linux.

The multifunction machine application general-purpose service 23 is the same as the multifunction machine application general-purpose service 14 in the image forming apparatus 10.

The Java® application execution environment 24 is a software module group that implements an environment for executing a Java® application on the terminal processor 20. The Java® application execution environment 24 includes the virtual machine 241, a multifunction machine class library 242, an application management part 243, and the image forming apparatus communication part 244.

The virtual machine 241, the multifunction machine class library 242, and the application management part 243 are the same as the virtual machine 151, the multifunction machine class library 152, and the application management part 153, respectively, in the image forming apparatus 10, and accordingly, a description thereof is omitted.

The image forming apparatus communication part 244 operates on the virtual machine 241 and communicates with the terminal processor communication part 154 of the image forming apparatus 10, thereby transmitting an operation request to the image forming apparatus 10 in the processing of a user application on the terminal processor 20 to the terminal processor communication part 154 of the image forming apparatus 10.

That is, a user application that performs the substantive processing of the virtual user application 16 of the image forming apparatus 10 is started in the terminal processor 20. However, since the control service 13 and other software modules below and the hardware specific to the image forming apparatus 10 do not exist in the terminal processor 20, a command generated from the user application to be executed in the control service 13 and other software modules below cannot actually be executed. (For example, the terminal processor 20 cannot actually perform scanning, copying, or facsimile transmission and reception.) Therefore, when an operation to be performed in the control service 13 and other software modules below occurs in a user application of the terminal processor 20, the image forming apparatus communication part 244 causes the operation-target image forming apparatus 10 to perform the operation by transmitting a request for the operation to the image forming apparatus 10, and receives its result. As a result, the control service 13 and other software modules below are virtually implemented on the terminal processor.

RPC is used in transmission of an operation request to the image forming apparatus 10 (the terminal processor communication part 154) by the terminal processor 20 (the image forming apparatus communication part 244). That is, the image forming apparatus communication part 244 has a mechanism for remotely calling the same function on the image forming apparatus 10 side and receiving its result when a function is called in the terminal processor 20. For example, when the Scan( ) function of the multifunction machine class library 242 is called by a user application in the terminal processor 20, the image forming apparatus communication part 244 calls the Scan( ) function of the multifunction machine class library 152 of the image forming apparatus 10 through the terminal processor communication part 154, and receives its result.

Further, the image forming apparatus communication part 244 causes a user application on the terminal processor 20 to execute at least part of processing (substantive processing) necessary to provide a service requested by a user in the image forming apparatus 10 by communicating with the terminal processor communication part 154 of the image forming apparatus 10. That is, the image forming apparatus communication part 244 receives (information of) an asynchronous event that occurs in the image forming apparatus 10 and is transmitted from the terminal processor communication part 154, and notifies a corresponding user application that is being executed of the event.

The user applications 25a, 25b, and 25c are examples of user applications that operate on the Java® application execution environment 24. That is, the user applications 25a, 25b, and 25c execute substantive processing in the virtual user application 16 of the image forming apparatus 10 on the terminal processor 20. User applications such as the user application 25a, 25b, and 25c make operation requests to the image forming apparatus by calling corresponding functions of the multifunction machine class library 242, and receive (information of) events that occur in the image forming apparatus 10 from the event class of the multifunction machine class library 242.

As described above, the multifunction machine class library 242 and the multifunction machine application general-purpose service 23 are the same as the multifunction machine class library 152 and the multifunction machine application general-purpose service 14, respectively, in the image forming apparatus 10 (that is, the multifunction machine class library 242 and the multifunction machine application general-purpose service 23 provide compatible or the same interfaces to upper applications). Accordingly, it is possible to cause an application that operates on the multifunction machine class library 152 or the multifunction machine application general-purpose service 14 in the image forming apparatus 10 to operate on the multifunction machine class library 242 or the multifunction machine application general-purpose service 23 of the terminal processor 20 as it is. Accordingly, there is no need to modify a user application anew in the case of changing the location of installation of the user application from the image forming apparatus 10 to the terminal processor 20.

One or more programs that implement the above-described software modules in the terminal processor 20 may be installed from a recording medium 201 such as a CD-ROM or an SD card or though the network 30.

Figure 8:
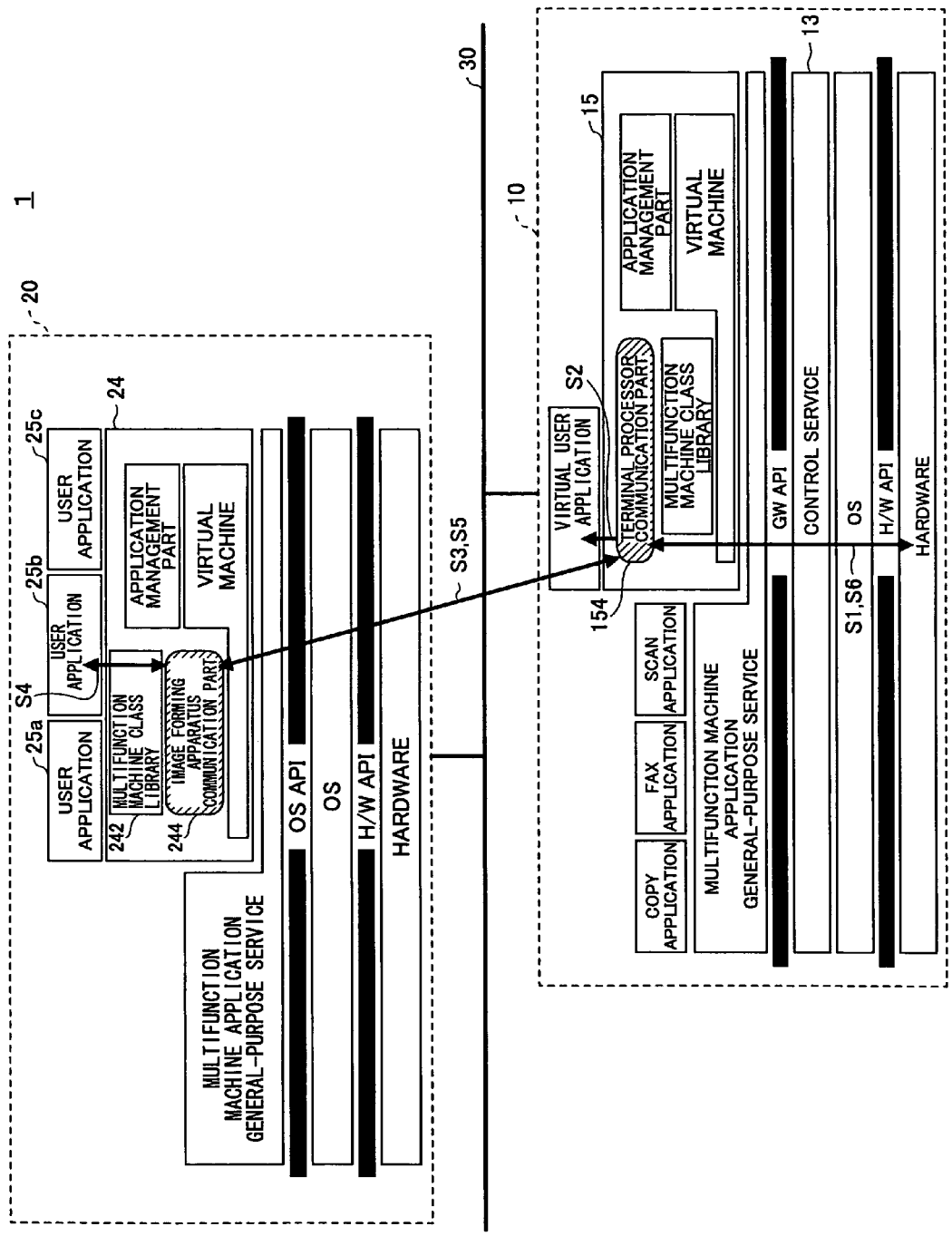
FIG. 8 is a diagram showing an interaction between the image forming apparatus and the terminal processor according to the second embodiment of the present invention.

The interaction between the image forming apparatus 10 and the terminal processor 20 described with reference to FIGS. 6 and 7 may be graphically illustrated as FIG. 8. FIG. 8 is a diagram showing an interaction between the image forming apparatus 10 and the terminal processor 20 according to the second embodiment.

As shown in FIG. 8, the terminal processor communication part 154 of the image forming apparatus 10 transmits (information of) an asynchronous event (S1) from the native layers including hardware resources or a request from the virtual user application 16 (S2) to the image forming apparatus communication part 244 of the terminal processor 20 (S3).

The image forming apparatus communication part 244 of the terminal processor 20 notifies a corresponding user application (the user application 25a, 25b, or 25c) of the received event (information) or request through the event class of the multifunction machine class library 242 (S4). The corresponding user application such as the user application 25b executes processing corresponding to the event or request. In the process of the processing, the corresponding user application such as the user application 25b uses (calls) the multifunction machine class library 242. At this point, if the processing of the native layers is required, the image forming apparatus communication part 244 transmits an operation request to the image forming apparatus 10 to the terminal processor communication part 154 thereof (S5). Receiving the operation request, the terminal processor communication part 154 notifies the native layers including the control service 13 of the operation request (S6). The hardware specific to the image forming apparatus 10 is controlled based on this operation request, so that, for example, scanning, facsimile transmission or reception, or copying is performed.

Next, a description is given of a processing procedure of the image processing system 1 according to the second embodiment. FIGS. 9A and 9B are flowcharts for illustrating execution of a user application in the image processing system 1 according to the second embodiment.

First, the terminal processor 20 and the image forming apparatus 10 are started by a user in steps S101 and S102, respectively, of FIG. 9A. When both the terminal processor 20 and the image forming apparatus 10 are started, in step S103, the terminal processing communication part 154 of the image forming apparatus 10 and the image forming apparatus communication part 244 of the terminal processor 20 establish a connection for communicating with each other. A detailed description of this processing is given below. In the following, the communications between the image forming apparatus 10 and the terminal processor 20 are performed by the terminal processing communication part 154 and the image forming apparatus communication part 244.

Next, in step S104, one or more user applications to be used are installed in a storage device of the terminal processor 20, such as an HDD or an SD card. The installation is performed based on an installation screen displayed by the application management part 243 on, for example, a display connected to the terminal processor 20 or the display of a PC connected to the terminal processor 20 via a network. Once installed, the user application does not have to be installed next time the terminal processor 20 is started.

Next, in step S105, the user presses a user application selection screen display key on the operations panel in front of the image forming apparatus 10. Then, in step S106, the application management part 153 causes a user application selection screen to be displayed on the operations panel. Here, the user application selection screen display key, which may be a button for causing the user application selection screen to be displayed on the liquid crystal display of the operations panel, is pre-disposed on the operations panel.

FIG. 10 is a diagram showing an example display of the user application selection screen. As shown in FIG. 10, a list of user applications installed in the image forming apparatus 10 or the terminal processor 20 is displayed on a user application selection screen 110. In FIG. 10, USER APPLICATION A, USER APPLICATION B, and USER APPLICATION C are displayed, which are the names of the user application 25a, the user application 25b, and the user application 25c, respectively. Information on the list of user applications installed in the image forming apparatus 10 or the terminal processor 20 is recorded in the virtual user application 16, and is obtained by the application management part 153 querying the virtual user application 16. Alternatively, the application management part 153 may query the terminal processor 20 so that information on the list of user applications installed in the terminal processor 20 may be obtained.

Next, in step S107, the user selects one of the user applications displayed on the user application selection screen 110 which one the user wishes to use. Here, it is assumed that USER APPLICATION A (the user application 25a) is selected and that the user application 25a is a business application related to scanning.

When USER APPLICATION A is selected by the user, in step S108, the application management part 153 starts the virtual user application 16. In step S109, the virtual user application 16 transmits a request to execute starting to the user application 25a of the terminal processor 20 during its starting (initialization).

Receiving the request to execute starting, in step S110, the user application 25a creates the operations screen of the user application 25a (hereinafter referred to as "USER APPLICATION A window [window for USER APPLICATION A]") and its display components. The display components include buttons disposed on the USER APPLICATION A window and labels to be attached to the buttons. The buttons serve to receive input from the user, and the labels serve to inform the user of messages. Here, a Scan Start button, a Scan Running label, a Scan Error label, a Scan Finish label, and a Scan Stop button are created as display components.

Next, in step S111, the user application 25a transmits a request to display the USER APPLICATION A window having Scan Start put thereon (having the Scan Start button disposed thereon) to the image forming apparatus 10. In step S112, the virtual user application 16 of the image forming apparatus 10 that has received the display request causes the USER APPLICATION A window created by the user application 25a of the terminal processor 20 to be displayed on the operations panel.

In more detail, the user application 25a commands display of the USER APPLICATION A window having Scan Start put thereon by calling a function of the multifunction machine class library 242. The command to the multifunction machine class library 242 is transmitted to the terminal processor communication part 154 of the image forming apparatus 10 by the image forming apparatus communication part 244. The terminal processor communication part 154 commands the control service 13 to display the USER APPLICATION A window. The control service 13 controls the operations panel, and causes the USER APPLICATION A window to be displayed on the operations panel.

Figure 11:
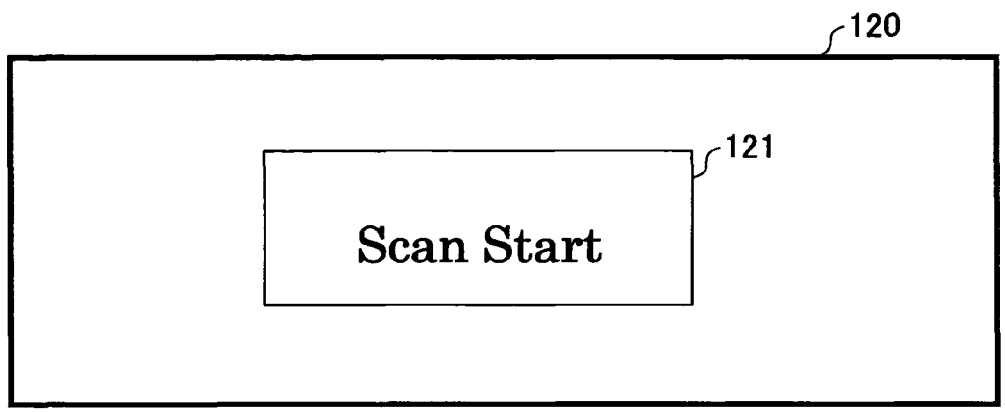
FIG. 11 is a diagram showing an example display of a USER APPLICATION A window having a Scan Start button put thereon according to the second embodiment of the present invention.

FIG. 11 is a diagram showing an example display of the USER APPLICATION A window having the Scan Start button put thereon. Referring to FIG. 11, a Scan Start button 121 is put and displayed on a USER APPLICATION A window 120.

Next, in step S113, the user presses the Scan Start button 121. Then, in step S114, the user application 25a of the terminal processor 20 is notified of the event through the network 30. In more detail, the terminal processor communication part 154 is notified of the event through the control service 13, and the terminal processor communication part 154 transmits a message that reports the event to the image forming apparatus communication part 244 of the terminal processor 20. The image forming apparatus communication part 244 notifies the user application 25a of the event through the event class of the multifunction machine class library 242.

Next, in step S115 of FIG. 9B, the user application 25a transmits a request to display the Scan Stop button and the Scan Running label on the USER APPLICATION A window 120 to the image forming apparatus 10. Then, in step S116, the virtual user application 16 of the image forming apparatus 10 that has received the display request causes the button and the label to be displayed on the USER APPLICATION A window 120 displayed on the operations panel.

Figure 12:
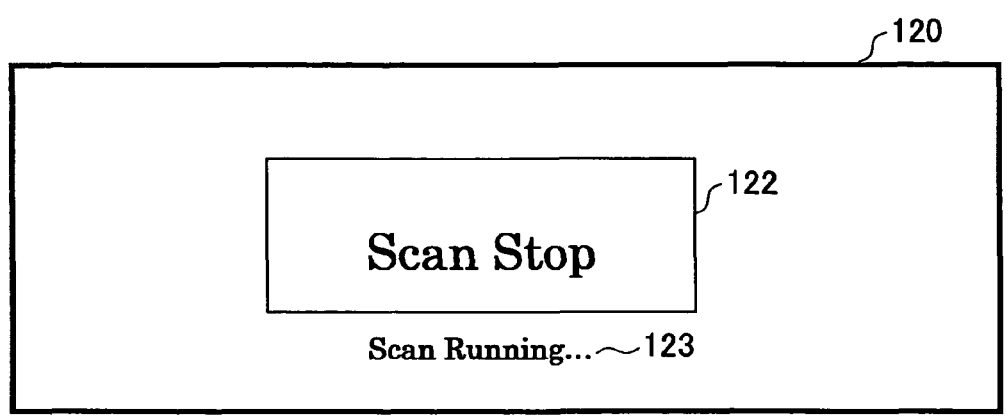
FIG. 12 is a diagram showing an example display of the USER APPLICATION A window having a Scan Stop button and a Scan Running label displayed thereon according to the second embodiment of the present invention.

FIG. 12 is a diagram showing an example display of the USER APPLICATION A window 120 having the Scan Stop button and the Scan Running label displayed thereon.

Referring to FIG. 12, a Scan Stop button 122 is for stopping a scan operation (scanning), and a Scan Running label 123 is for having a user recognize that a scan operation (scanning) is being performed.

Further, in step S117, the user application 25a transmits a request to perform a scan operation to the image forming apparatus 10 in parallel with the request to display the Scan Stop button 122 and the Scan Running label 123. Then, in step S118, a scanning operation is performed by a scanner in the hardware 11 of the image forming apparatus 10, so that a paper document is converted into electronic data. A detailed description is given below of the exchange between the terminal processor 20 and the image forming apparatus 10 in steps S117 and S118.

If the scan operation ends normally (YES in step S119), an event of normal termination occurs at the scanner. In step S120, the terminal processor communication part 154 notifies the user application 25a of the event through the image forming apparatus communication part 244.

Being notified of normal termination of the scan operation, in step S121, the user application 25a transmits a request to display the Scan Finish label on the USER APPLICATION A window 120 to the image forming apparatus 10. Then, in step S122, the virtual user application 16 of the image forming apparatus 10 that has received the display request causes the label to be displayed on the USER APPLICATION A window 120 displayed on the operations panel.

Figure 13:
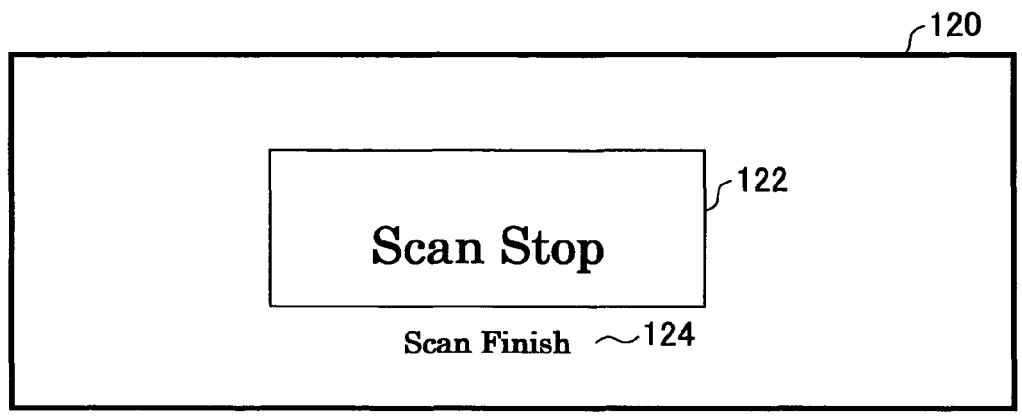
FIG. 13 is a diagram showing an example display of the USER APPLICATION A window having a Scan Finish label displayed thereon according to the second embodiment of the present invention.

FIG. 13 is a diagram showing an example display of the USER APPLICATION A window 120 having the Scan Finish label displayed thereon. Referring to FIG. 13, a Scan Finish label 124 is for letting a user recognize that the scan operation has ended normally.

On the other hand, if, for example, a jam occurs during conveyance of a document or an image cannot be read normally, so that the scan operation ends abnormally (NO in step S119), an event of abnormal termination occurs from the scanner. In step S123, the terminal processor communication part 154 notifies the user application 25a of the event through the image forming apparatus communication part 244.

Being notified of abnormal termination of the scan operation, in step S124, the user application 25a transmits a request to display the Scan Error label on the USER APPLICATION A window 120 to the image forming apparatus 10. Then, in step S125, the virtual user application 16 of the image forming apparatus 10 that has received the display request causes the label to be displayed on the USER APPLICATION A window 120 displayed on the operations panel.

Figure 14:
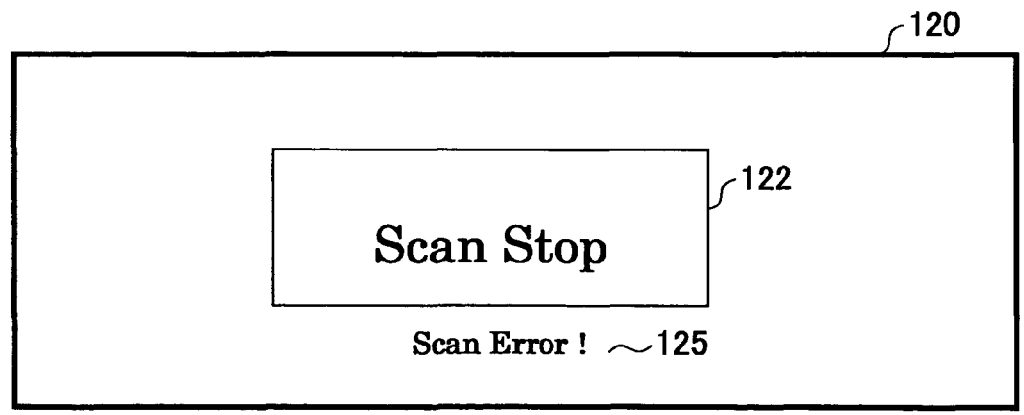
FIG. 14 is a diagram showing an example display of the USER APPLICATION A window having a Scan Error label displayed thereon according to the second embodiment of the present invention.

FIG. 14 is a diagram showing an example display of the USER APPLICATION A window 120 having the Scan Error label displayed thereon. Referring to FIG. 14, a Scan Error label 125 is for letting a user recognize that the scan operation has ended abnormally.

In step S126, the user presses the Scan Stop button 122 during the scan operation or after step S122 or S125. Then, in step S127, the virtual user application 16 notifies the user application 25a of termination of the scan operation through the terminal processor communication part 154 and the image forming apparatus communication part 244. In response to the notice from the virtual user application 16, the user application 25a performs finalization in step S128, and ends in step S129.

Figure 15:
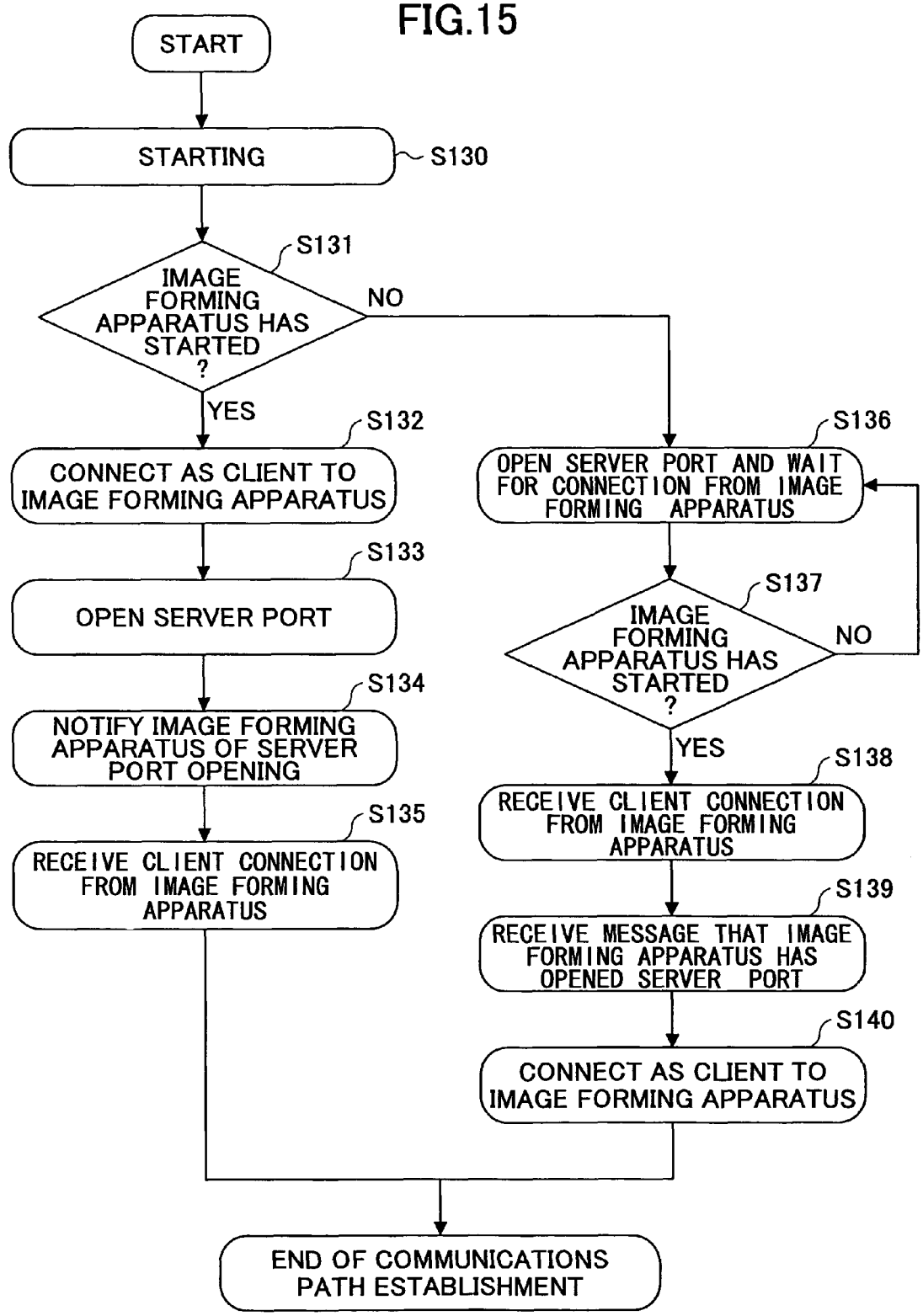
FIG. 15 is a flowchart for illustrating a case of establishing a connection between the terminal processor and the image forming apparatus according to the second embodiment of the present invention.

Next, a detailed description is given of establishing a connection between the terminal processor 20 and the image forming apparatus 10 in step S103 of FIG. 9A. FIG. 15 is a flowchart for illustrating a case of establishing a connection between the terminal processor 20 and the image forming apparatus 10.

When the terminal processor 20 starts in step S130, in step S131, the terminal processor 20 determines whether the image forming apparatus 10 has already started. If the image forming apparatus 10 has already started (YES in step S131), in step S132, the image forming apparatus communication part 244 of the terminal processor 20 connects as a client to the terminal processor communication part 154 of the image forming apparatus 10. As a result, communications means in which the terminal processor 20 serves as a trigger is ensured.

Next, in step S133, the image forming apparatus communication part 244 opens a server port, and in step S134, notifies the terminal processor communication part 154 of the opening of the server port. Then, in step S135, the image forming apparatus communication part 244 receives a connection as a client from the terminal processor communication part 154 that has received the notice. As a result, communications means in which the image forming apparatus 10 serves as a trigger is ensured.

On the other hand, if the image forming apparatus 10 has not yet started (NO in step S131), in step S136, the image forming apparatus communication part 244 opens a server port and waits for a connection from the image forming apparatus 10. When the image forming apparatus 10 starts (YES in step S137), in step S138, the image forming apparatus communication part 244 receives a connection as a client from the terminal processor communication part 154. As a result, communications means in which the image forming apparatus 10 serves as a trigger is ensured.

Next, in step S139, the image forming apparatus communication part 244 is notified that the terminal processor communication part 154 has opened a server port, and in step S140, connects as a client to the terminal processor communication part 154. As a result, communications means in which the terminal processor 20 serves as a trigger is ensured.

A connection is thus established between the terminal processor 20 and the image forming apparatus 10 so that communications are performable with both serving as triggers.

Figure 16:
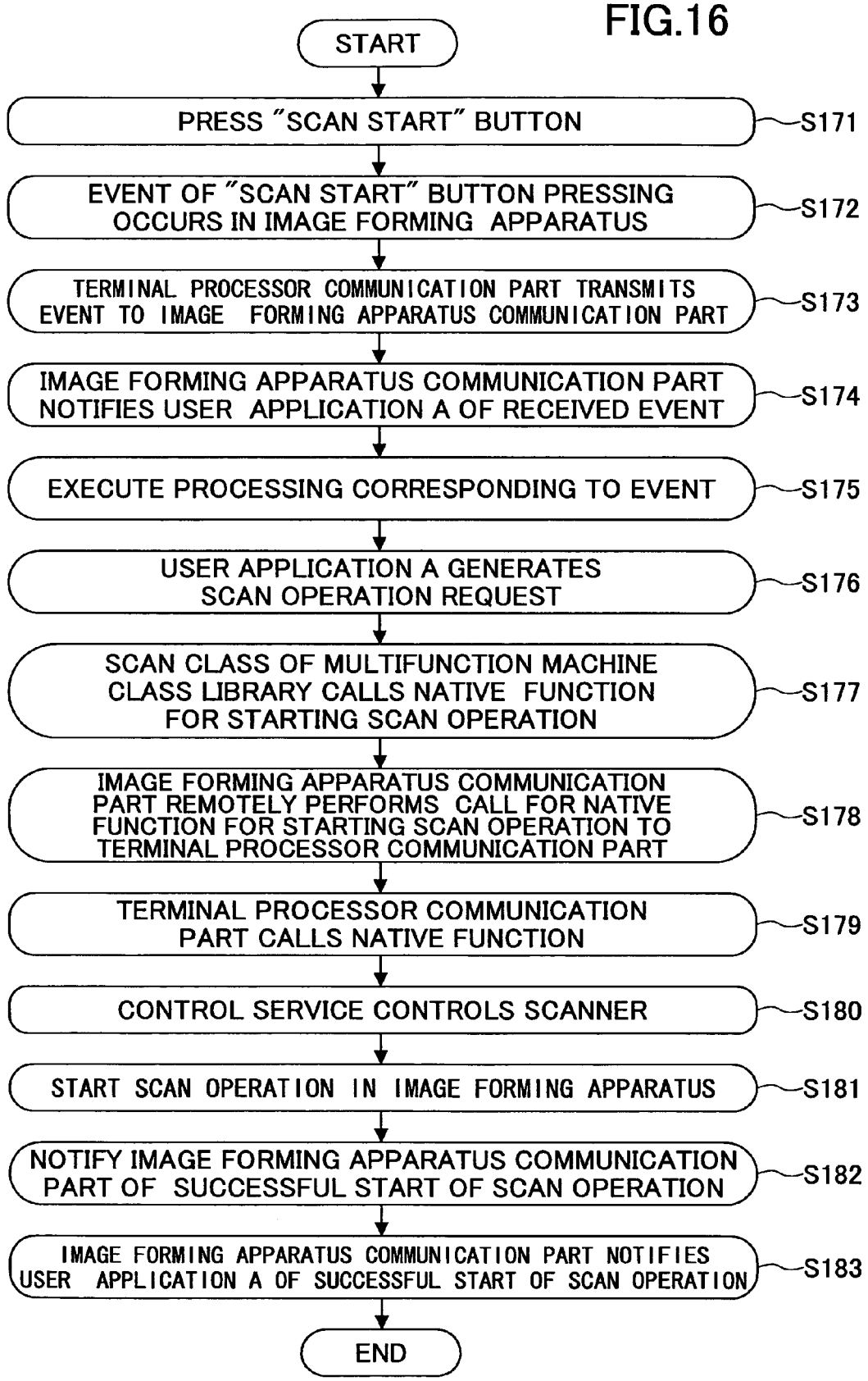
FIG. 16 is a flowchart for illustrating a scan operation in detail according to the second embodiment of the present invention.

Next, a detailed description is given of the scan operation in steps S117 and S118 of FIG. 9B. FIG. 16 is a flowchart for illustrating the scan operation in detail.

In step S171, a user presses the Scan Start button 121 of the USER APPLICATION A window displayed on the operations panel of the image forming apparatus 10. Then, in step S172, an event that reports the pressing of the Scan Start button 121 occurs at the operations panel.

Detecting the event, in step S173, the terminal processor communication part 154 transmits a message reporting the occurrence of the event to the image forming apparatus communication part 244 of the terminal processor 20. In step S174, the image forming apparatus communication part 244 notifies the user application 25a of the occurrence of the event. Then, in step S175, the user application 25a executes business logic implemented as processing corresponding to the event (for example, processing specific to the business of the user). Performing such processing on the terminal processor 20 side makes it possible to reduce the work load on the image forming apparatus 10.

If it is necessary to operate the hardware 11 (a scanner in this case) of the image forming apparatus 10 in this business logic execution, in step S176, the user application 25a notifies the Scan class of the multifunction machine class library 242 of a request to operate a scanner.

In step S177, the multifunction machine class library 242 calls a native layer function for starting a scan operation in response to the request from the user application 25a. Then, in step S178, the image forming apparatus communication part 244 performs a call according to RPC for the native function for starting a scan operation to the terminal processor communication part 154 of the image forming apparatus 10.

Receiving the PRC call for the native function, in step S179, the terminal processor communication part 154 performs a call for the native function to the native layer (the multifunction machine application service 14 or the control service 13) of the image forming apparatus 10. Here, if the multifunction machine application service 14 is called, the calling is finally reported to the control service 13.

Next, in step S180, a scan service in the control service 13 controls the scanner of the hardware 11, and in step S181, causes a scan operation to be started. When the scan operation successfully starts, in step S182, the terminal processor communication part 154 notifies the image forming apparatus communication part 244 of the successful start of the scan operation. In step S183, the image forming apparatus communication part 244 notifies the user application 25a of the successful start of the scan operation. The USER APPLICATION A continues the subsequent processing based on this notice.

As described above, according to the image processing system 1 according to the second embodiment, the terminal processor 20 is caused to execute at least part of processing that an application of the image forming apparatus 10 is requested to execute (such as creation of a window, labels and buttons and execution of business logic in the second embodiment), and to control a hardware resource of the image forming apparatus 10 as required. That is, it is possible to distribute the work load on the image forming apparatus 10 by executing a user application not on the image forming apparatus 10, which is in general severely limited in memory capacity, but using the memory of the terminal processor 20 that can be increased in memory as desired. Accordingly, it is possible to cause multiple user applications to be simultaneously executed without being bound by memory limitation.

Further, in the terminal processor 20, it is possible to operate the hardware resources specific to the image forming apparatus 10 transparently to a user application using the image forming apparatus communication part 244. That is, simple relocation of an application on the image forming apparatus 10 to a general-purpose computer such as a PC does not guarantee the operation of the application because the computer does not have the hardware resources specific to the image forming apparatus 10. However, the terminal processor 20 according to this embodiment eliminates this disadvantage as described above.

The virtual user application 16 controls display of a user interface for receiving user's input on a panel on the image forming apparatus 10 and performs control, such as starting and stopping, of a user application on the terminal processor 20. Such processing consumes less memory than creation of display components (such as buttons and labels) or execution of business logic. Accordingly, even if execution of the virtual user application 16 is taken into consideration, it is possible to reduce the overall memory consumption of the image forming apparatus 10 and the overall work load on the CPU of the image forming apparatus 10.

Further, the virtual user application 16 appears as the user application 25a to a user. Accordingly, it is possible to let a user application be used while making it transparent whether the user application is being executed in the image forming apparatus 10 or in the terminal processor 20 through the network 30 (that is, the same as the user application 25a is implemented in the image forming apparatus 10).

Further, the single terminal processor 20 may be provided for multiple image forming apparatuses 10. In this case, all user applications that are virtually executed in the image forming apparatuses 10 are managed in the terminal processor 20. This makes it possible to simplify maintenance such as upgrading a user application.

Next, a description is given of the third embodiment of the present invention. In the third embodiment, a description is given of the case of causing a Java® application (user application) to be virtually executed in an image forming apparatus that cannot have a Java® virtual machine installed therein because of severer CPU and memory limitations.

Figure 17:
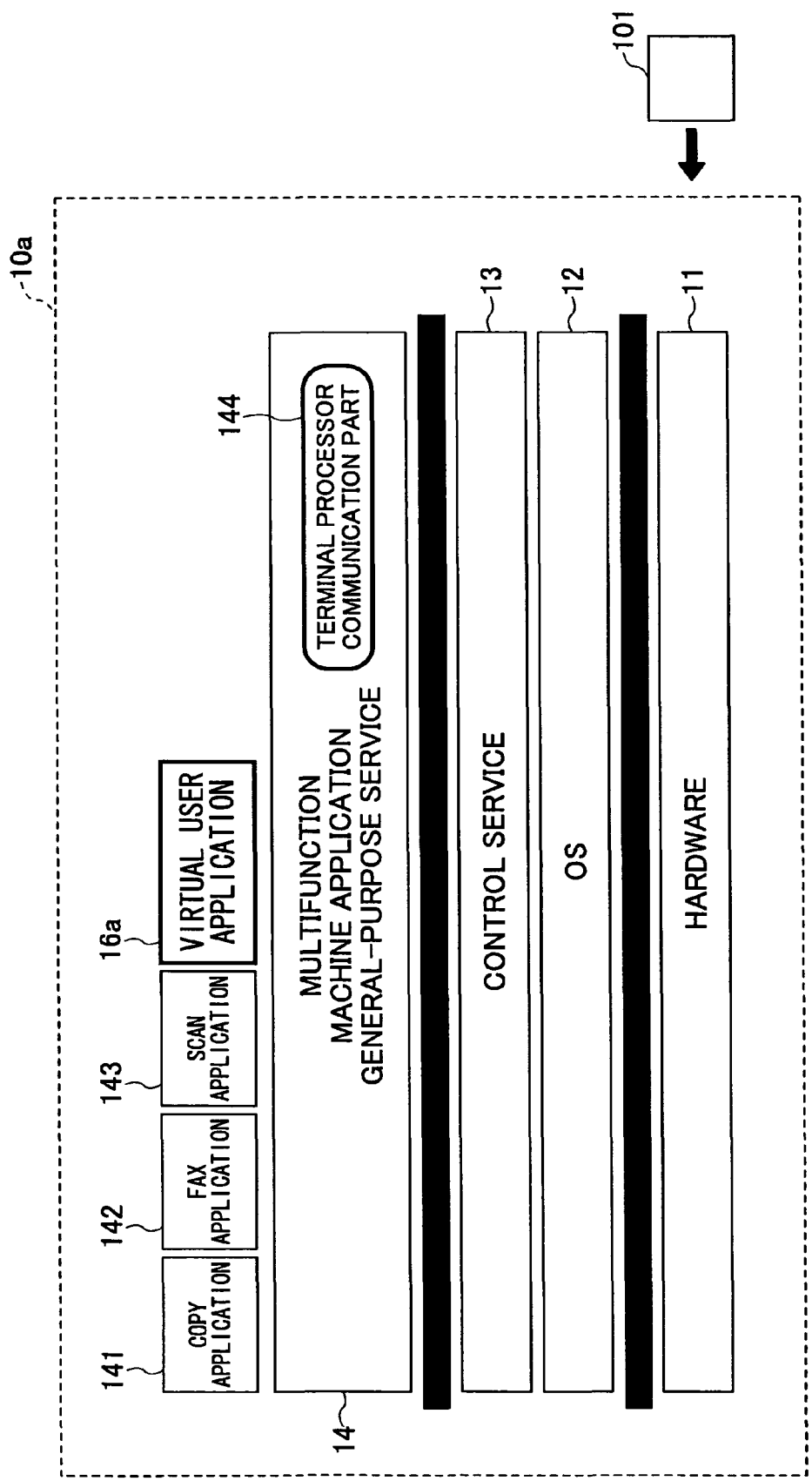
FIG. 17 is a schematic diagram showing a configuration of an image forming apparatus according to a third embodiment of the present invention.

FIG. 17 is a schematic diagram showing a configuration of an image forming apparatus 10a according to the third embodiment. In FIG. 17, the same elements as those of FIG. 6 are referred to by the same numerals, and a description thereof is omitted.

The image forming apparatus 10a in FIG. 17 is subjected to severer CPU and memory limitations. Accordingly, the Java® application execution environment 15 including the virtual machine is not implemented in the image forming apparatus 10a.

On the other hand, the image forming apparatus 10a includes a terminal processor communication part 144 that operates in the multifunction machine application general-purpose service 14 and a virtual user application 16a that operates on the multifunction machine application general-purpose service 14.

The terminal processor communication part 144 has the same functions as the terminal processor communication part 154 of FIG. 6, but is different therefrom in that while the terminal processor communication part 154 is implemented as a Java® application that operates on the virtual machine 151, the terminal processor communication part 144 is implemented with C or C++ and operates in the multifunction machine application general-purpose service 14.

The virtual user application 16a has the same functions as the virtual user application 16 of FIG. 6, but is different therefrom in that while the virtual user application 16 is implemented as a Java® application that operates on the virtual machine 151, the virtual user application 16a is implemented with C or C++ and operates on the multifunction machine application general-purpose service 14.

The image forming apparatus 10a also includes an operations panel that serves as an input/output interface with a user as part of the hardware 11. The user can give instructions to execute applications in the image forming apparatus 10a by operating the operations panel.

Figure 18:
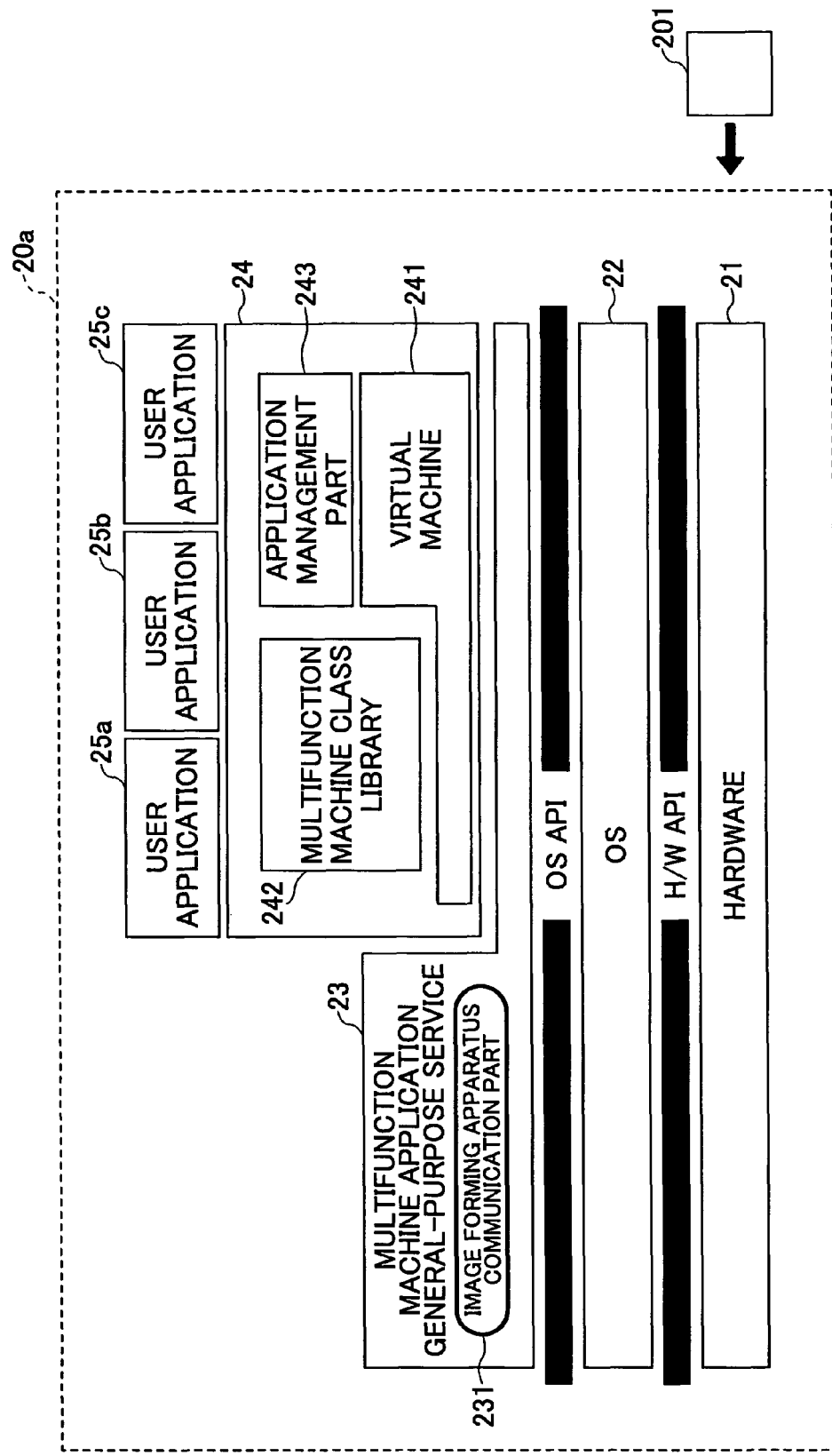
FIG. 18 is a schematic diagram showing a configuration of a terminal processor according to the third embodiment of the present invention.

FIG. 18 is a schematic diagram showing a configuration of a terminal processor 20a according to the third embodiment. In FIG. 18, the same elements as those of FIG. 7 are referred to by the same numerals, and a description thereof is omitted.

The terminal processor 20a in FIG. 18 has substantially the same configuration as the terminal processor 20 in FIG. 7, but is different therefrom in having an image forming apparatus communication part 231 in place of the image forming apparatus communication part 244.

The image forming apparatus communication part 231 has the same functions as the image forming apparatus communication part 244, but is different therefrom in that while the image forming apparatus communication part 244 is implemented as a Java® application that operates on the virtual machine 241, the image forming apparatus communication part 231 is implemented with C or C++ and operates in the multifunction machine application general-purpose service 23.

Figure 19:
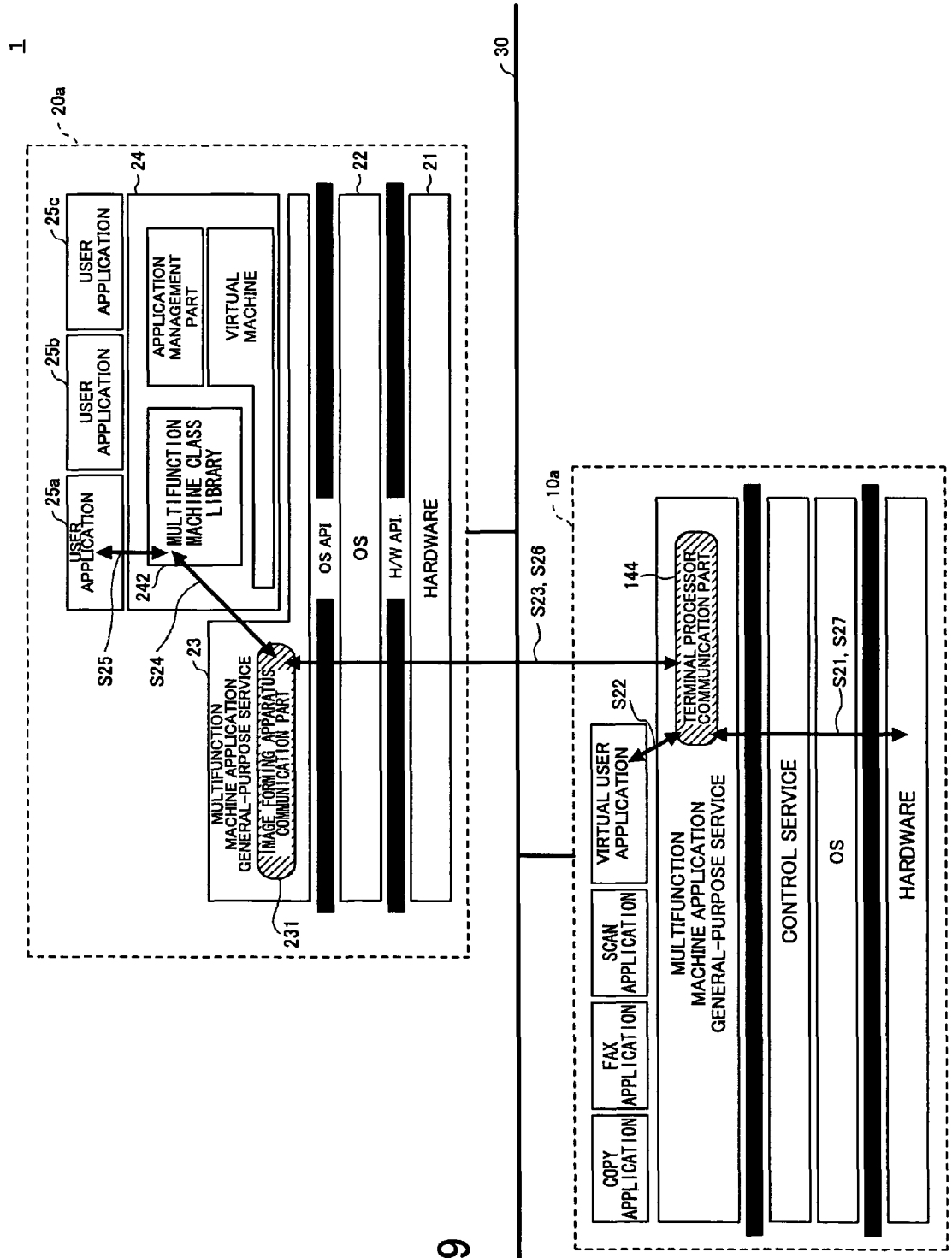
FIG. 19 is a diagram showing an interaction between the image forming apparatus and the terminal processor according to the third embodiment of the present invention.

FIG. 19 is a diagram showing an interaction between the image forming apparatus 10a and the terminal processor 20a according to the third embodiment.

As shown in FIG. 19, the terminal processor communication part 144 of the image forming apparatus 10a transmits (information of) an asynchronous event (S21) from the native layers or a request from the virtual user application 16a (S22) to the image forming apparatus communication part 231 of the terminal processor 20a (S23).

The image forming apparatus communication part 231 of the terminal processor 20a notifies, through the event class of the multifunction machine class library 242 (S24), a corresponding user application (the user application 25a, 25b, or 25c) of the received event (information) or request (S25). The corresponding user application such as the user application 25a executes processing corresponding to the event or request. In the process of the processing, the corresponding user application such as the user application 25a uses (calls) the multifunction machine class library 242. At this point, if the processing of the native layers is required, the image forming apparatus communication part 231 transmits an operation request to the image forming apparatus 10a to the terminal processor communication part 144 thereof (S26). Receiving the operation request, the terminal processor communication part 144 notifies the native layers including the control service 13 of the operation request (S27). A hardware resource specific to the image forming apparatus 10a is controlled based on this operation request, so that, for example, scanning, facsimile transmission or reception, or copying is performed.

The processing procedures corresponding to FIGS. 9A, 9B, 15, and 16 in the third embodiment are obvious from the above description, and accordingly, a description thereof is omitted herein.

As described above, according to the image processing system 1 according to the third embodiment, even the image forming apparatus 10a without the virtual machine 151 can virtually execute a user application by causing the terminal processor 20a to execute the user application.

In the above-described second and third embodiments, the image forming apparatus (10, 10a) is taken as an example of the electronic apparatus. However, the object of application of the present invention is not limited to the image forming apparatus. For example, the present invention is effectively applicable to various apparatuses that are subjected to severe memory restrictions but are required to perform high-speed processing, such as digital consumer electronics, mobile communications terminals, and train stations' automatic ticket gates.

Thus, according to embodiments of the present invention, there are provided a communications device, an electronic apparatus, an information processing system, and an application executing method capable of relaxing restrictions on execution of an application due to the limitations of the hardware resources of the electronic apparatus, and a recording medium on which is recorded a program for causing a computer to execute the application executing method.

The present invention is not limited to the specifically disclosed embodiments, and variations and modifications may be made without departing from the scope of the present invention.

The present application is based on Japanese Priority Patent Applications No. 2005-362343, filed on Dec. 15, 2005, and No. 2006-129484, filed on May 8, 2006, the entire contents of which are hereby incorporated by reference.

What is claimed is:

1. An information processing system, comprising:
an image forming apparatus including a virtual user application and a hardware resource, wherein the virtual user application of the image forming apparatus is configured to operate the hardware resource of the image forming apparatus; and
a communications device including a communication part configured to perform communications with the image forming apparatus, and an application program which prepares operation screen data, and wherein the communication part of the communications device
sends a display request to the image forming apparatus in response to receiving a request to display an operation screen, and wherein the display request corresponds to the operation screen data of the application program,
receives, from the image forming apparatus, a report of input to the operation screen at the image forming apparatus,
reports the report of input to the application program,
sends, to the virtual user application of the image forming apparatus, an operation request for the hardware resource, wherein the operation request is unique to the image forming apparatus in a process of the application program of the communications device executed in response to the report of input, such that the hardware resource is operated by the virtual user application in response to receipt of the operation request from the communication part,
reports, to the application program, an event received from the image forming apparatus, the event being generated by the hardware resource by executing an operation according to the input to the operation screen at the image forming apparatus, and
sends an update request to the image forming apparatus in response to a request for updating part of the operation screen received from the application program according to the event.

2. The information processing system as claimed in claim 1, wherein the communications device further comprises: an interface provision part configured to provide the application program with an interface for causing the hardware resource to be controlled, wherein the application program calls the interface in the interface provision part for requesting to operate the hardware resource in the processing of the application program executed in response to the interruption event.

3. The information processing system as claimed in claim 2, wherein the communication part notifies the application program of the interruption event through the interface provided by the interface provision part.

4. The information processing system as claimed in claim 2, wherein the interface provision part provides the interface compatible with an interface provided by the image forming apparatus in order to cause the virtual user application in the image forming apparatus to control the hardware resource.

5. The information processing system as claimed in claim 1, wherein the interruption event includes information detected in the hardware resource and reported to software.

6. The information processing system as claimed in claim 1, further comprising: an installation part configured to install the application program.

* * * * *